United States Patent
Sangani et al.

(10) Patent No.: US 10,810,538 B1
(45) Date of Patent: Oct. 20, 2020

(54) OFF NETWORK ORDER OPERATIONS INCLUDING ACCESS CODE ACTIVATION FOR PICKUP LOCATIONS

(71) Applicant: Amazon Technologies, Inc., Seattle, WA (US)

(72) Inventors: Rucheek Hasmukh Sangani, Kirkland, WA (US); Piyush Gupta, Issaquah, WA (US); Neha Goswami, Seattle, WA (US); Nicholas John Morren, Seattle, WA (US); Ameya Rahane, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 15/915,519

(22) Filed: Mar. 8, 2018

Related U.S. Application Data

(63) Continuation of application No. 13/960,785, filed on Aug. 6, 2013, now Pat. No. 9,934,483.

(51) Int. Cl.
*G06Q 10/08* (2012.01)
*B65G 1/137* (2006.01)

(52) U.S. Cl.
CPC ....... *G06Q 10/0837* (2013.01); *B65G 1/1378* (2013.01); *G06Q 10/08* (2013.01); *G06Q 10/087* (2013.01)

(58) Field of Classification Search
None
See application file for complete search history.

(56) References Cited

U.S. PATENT DOCUMENTS

| | | |
|---|---|---|
| 4,865,248 A | 9/1989 | Barth |
| 5,386,462 A | 1/1995 | Schlamp |
| 6,344,796 B1 | 2/2002 | Ogilvie et al. |
| 6,426,699 B1 | 7/2002 | Porter |
| 6,439,345 B1 | 8/2002 | Recktenwald et al. |
| 6,690,997 B2 | 2/2004 | Rivalto |
| 6,694,217 B2 | 2/2004 | Bloom |
| 6,791,450 B2 | 9/2004 | Gokcebay et al. |
| 6,919,803 B2 | 7/2005 | Breed |

(Continued)

FOREIGN PATENT DOCUMENTS

| | | |
|---|---|---|
| CN | 1552037 A | 12/2004 |
| CN | 101263516 A | 9/2008 |

(Continued)

OTHER PUBLICATIONS

"Focus on: Automated Storage," Anonymous. Modern Materials Handling, [Warehousing Management Edition]; Framingham 65.11 (Nov. 2010): 36-38, 40-41.

(Continued)

*Primary Examiner* — Joseph W. King
(74) *Attorney, Agent, or Firm* — Athorus, PLLC

(57) ABSTRACT

A pickup location is enabled to operate when communication over a network is not available by preemptively synchronizing certain data. For the delivery of an item, an access code that will be used by the user for retrieving the item from a storage compartment at the pickup location may be generated and synchronized between the pickup location and a remote computing resource before the item is delivered. Once the item is delivered to the pickup location, the access code is activated so that it can be used by the user for retrieving the item from the storage compartment.

20 Claims, 12 Drawing Sheets

(56) References Cited

U.S. PATENT DOCUMENTS

| | | |
|---|---|---|
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,661,591 B2 | 2/2010 | Dearing et al. |
| 7,693,745 B1 | 4/2010 | Pomerantz et al. |
| 7,925,375 B2 | 4/2011 | Schininger et al. |
| 8,015,023 B1 | 9/2011 | Lee et al. |
| 8,078,317 B2 | 12/2011 | Allinson et al. |
| 8,131,607 B2 | 3/2012 | Park et al. |
| 8,145,351 B2 | 3/2012 | Schininger et al. |
| 8,195,328 B2 | 6/2012 | Mallett et al. |
| 2001/0045449 A1 | 11/2001 | Shannon |
| 2002/0016726 A1 | 2/2002 | Ross |
| 2002/0087375 A1 | 7/2002 | Griffin et al. |
| 2002/0116289 A1 | 8/2002 | Yang |
| 2002/0177922 A1 | 11/2002 | Bloom |
| 2005/0103842 A1 | 5/2005 | Bong et al. |
| 2005/0184857 A1 | 8/2005 | Roatis et al. |
| 2006/0004675 A1 | 1/2006 | Bennett et al. |
| 2006/0175942 A1 | 8/2006 | Meek et al. |
| 2007/0150375 A1 | 6/2007 | Yang |
| 2007/0170237 A1 | 7/2007 | Neff |
| 2009/0063166 A1 | 3/2009 | Palmer |
| 2009/0106124 A1 | 4/2009 | Yang |
| 2009/0166403 A1 | 7/2009 | Volpe et al. |
| 2009/0248527 A1 | 10/2009 | Strimling et al. |
| 2012/0039694 A1 | 2/2012 | Suzanne |
| 2012/0062362 A1 | 3/2012 | Rudduck et al. |
| 2013/0005487 A1 | 1/2013 | Frazzini et al. |
| 2013/0088323 A1 | 4/2013 | Ryan |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2014/0018949 A1 | 1/2014 | Linton et al. |
| 2014/0052661 A1 | 2/2014 | Shakes et al. |
| 2015/0088780 A1 | 3/2015 | Paul |

FOREIGN PATENT DOCUMENTS

| | | |
|---|---|---|
| CN | 201749494 U | 2/2011 |
| CN | 102024239 A | 4/2011 |
| CN | 201837876 U | 5/2011 |
| CN | 202166878 U | 3/2012 |
| RU | 2155990 C2 | 9/2000 |
| RU | 97552 U1 | 9/2010 |
| WO | 2003014883 A2 | 2/2003 |
| WO | 2004072875 A1 | 8/2004 |
| WO | 2006065945 A2 | 6/2006 |
| WO | 2011036498 A2 | 3/2011 |
| WO | 2013148123 A1 | 10/2013 |

OTHER PUBLICATIONS

"Planning just-in-time supply operations: A multiple-case analysis" Ferrin, Bruce Gary. The Pennsylvania State University, ProQuest Dissertation Publishing, 1991. 9214157.

Search Report for Russian Federation Application No. 2016141085, dated Feb. 17, 2020, 2 pages.

U.S. Appl. No. 12/398,602, filed Mar. 5, 2009, Shaikh et al., "System and Method for Generating Predictions for Unit Allocation in a Materials Processing Network".

Mulcahy, James J., Shihong Huang, and Andrew B. Veghte. "Leveraging service-oriented architecture to extend a legacy commerce system." System Conference, 2010 4th Annual IEEE. IEEE, 2010.

OFF NETWORK ORDER OPERATIONS INCLUDING ACCESS CODE ACTIVATION FOR PICKUP LOCATIONS

CROSS-REFERENCE TO RELATED APPLICATIONS

This application is a continuation of U.S. patent application Ser. No. 13/960,785, filed Aug. 6, 2013, the contents of which are hereby incorporated by reference herein in their entirety.

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

In some instances, a customer may order an item and designate a pickup location as the delivery location. A pickup location may include a control station and storage compartments where the items that are ordered from a materials handling facility can be delivered for pickup by customers. Rather than shipping the item to a residence or place of business, the item may be shipped to the pickup location and stored in a storage compartment for retrieval by the customer. The control station at the pickup location typically relies on communication over a network for various processes related to the delivery of items by carriers and the retrieval of items by customers. If communication over the network becomes unavailable, such as due to a network outage, the control station may not be able to perform the required processes for the deliveries and retrievals of items.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
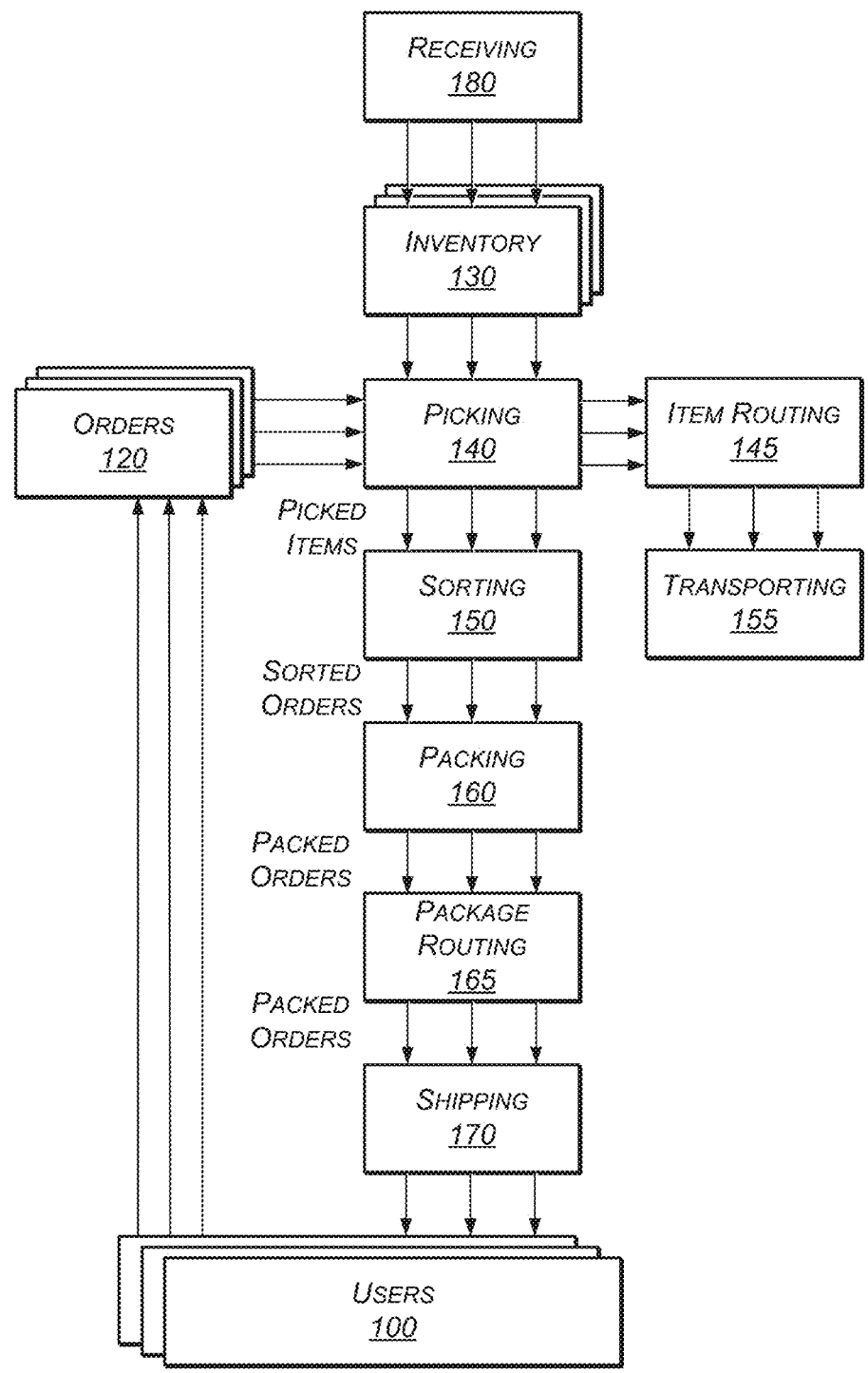
FIG. 1 illustrates a broad view of the operation of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes systems and methods for performing operations for a pickup location when communication with the pickup location is not available. A control station of the pickup location may typically require communication over the network for performing certain processes related to the delivery and/or retrieval of items. For example, with regard to the delivery of an item by a carrier, a traditional process would require that a communication be sent to lookup the scanned tracking identification and order information when the item arrives at the pickup location. However, if communication over the network is not available when the item is delivered, the control station may not be able to identify or accept the item. As an alternative, the order data including a tracking identification may be sent to the control station in advance, so that if communication over the network is not available when the item is delivered to the pickup station, the item can still be identified and accepted.

The process for notifying a user when an item is available for pickup also traditionally relies on communication from the control station over the network. More specifically, when an item is delivered by a carrier to a pickup location, the control station at the pickup location typically sends a communication over the network that confirms that the item has been delivered. In response, a remote computing resource may send a message to the user that the item is available for pickup. If communication with the control station is not available when the item is delivered, this traditional process may be disrupted. As an alternative, a delivery confirmation received from a carrier may be utilized for determining if a message will be sent to the user that the item is available for pickup. The carrier who delivered the item may be evaluated in terms of reliability or other factors to determine if the message will be sent to the user. For example, if the carrier is known to have a high correlation between sending delivery confirmations and items actually being delivered, there may be a high level of confidence in that carrier. In such a case, when communication with the control station is not available but a delivery confirmation is received from the carrier, there may be high confidence that the item has actually been delivered, on the basis of which a message may be sent to the user that the item is available for pickup.

When a message is sent to a user that an item is available for pickup, the message may also include an access code that will be used by the user to open the storage compartment at the pickup location for retrieving the item. The control station at the pickup location has traditionally been required to communicate over the network with regard to the access code. For example, if the control station generates the access code in response to the item being delivered, the access code may be communicated to a remote computing resource for being sent to the user. Alternatively, if the access code is generated by the remote computing resource or the user, it may be sent to the control station so that it can be associated with the correct storage compartment, and so the control station can activate the access code when the item is delivered. If communication with the control station over the network is not available when the item is delivered, these processes may be disrupted. As an alternative, the access code may be synchronized between the remote computing resource and the control station ahead of time before the item is delivered to the pickup location. Thus, if the access code is generated by the control station, it can be sent to the remote computing resource before the item is delivered, so that it can be sent to a user even if the control station is not able to communicate over the network when the item is delivered. Similarly, if the access code is generated by the user or the remote computing resource, it can be sent to the control station before the item is delivered, so that the control station will be able to activate the access code and associate it with the correct storage compartment, even if communication over the network is not available when the item is delivered to the pickup location.

In addition, when communication with the control station is not available over the network, the control station may store data regarding the delivery of items by carriers and the retrieval of items by users, to be sent when communication is again available. This stored data may be utilized for various purposes. For example, if a message has not yet been sent to a user that an item is available for pickup because of uncertainty about a carrier who sent the delivery confirmation, the receipt of stored data from the control station may provide the needed confirmation for sending the message to the user. In addition, the stored data that is received regarding the delivery of an item by a carrier may be added to the statistics for determining the reliability of the carrier. For example, if a carrier sends a delivery confirmation when communication with the control station is not available, and later when communication is restored a confirmation is received from the control station, the confidence level for the carrier may be increased.

A control station of the pickup location may also typically require communication over the network for performing certain processes related to returns of items by users. For example, with regard to the return of an item, a user may bring the item to the pickup location and place it in a storage compartment from which it will be retrieved by a carrier who will deliver it back to a materials handling facility. A request for the carrier to come to the pickup location to retrieve the item will not typically be sent until the user has delivered the item to the pickup location. One reason for this is that it may be unknown exactly when or if the user will deliver the item to the pickup location. If communication over a network is not available when the item is delivered to the pickup location by the user, the control station will not be able to send an indication that the item is ready for retrieval by the carrier. As an alternative, the control station may be enabled to provide the item to a carrier who has arrived at the pickup location for other reasons without having received a request to retrieve the item. For example, the control station may have an access code stored in memory that was previously provided to a carrier, and may associate that access code with the item. When the carrier arrives and enters the access code, such as to retrieve another item or for a daily pickup, the storage compartment, as well as any other storage compartments associated with the access code, may be opened so that the carrier can retrieve the items from the storage compartments.

In addition, a retrieval confirmation that is received from a carrier may be utilized to allow a refund or replacement to be issued to a user more quickly, and to allow capacity information for the pickup location to be updated. For example, if communication over the network is not available, the control station may not be able to send a confirmation that the item was delivered to the pickup location by the user, or that the item was retrieved from the pickup location by a carrier. In such a circumstance, a traditional system may wait until the item is confirmed as having reached a materials handling facility for the return before issuing a refund or replacement or updating the capacity information for the pickup location. As an alternative, when a retrieval confirmation is received from a carrier who retrieved the item, the carrier may be evaluated in terms of criteria such as reliability or other factors to determine if a refund or replacement process will be immediately initiated and if the capacity information for the pickup location will be updated. For example, if the carrier is known to have a high correlation between sending retrieval confirmations and items actually having been retrieved, there may be a high level of confidence in that carrier. In such a case, when communication with the control station is not available but a retrieval confirmation is received from the carrier, there may be a high confidence that the item has actually been retrieved, on the basis of which a refund or replacement process may be immediately initiated and the capacity information for the pickup location may be updated.

A block diagram of a materials handling facility, which, in one implementation, may be an order fulfillment facility configured to utilize various systems and methods described herein, is illustrated in FIG. 1. In this example, multiple users 100 may submit orders 120, where each order 120 specifies one or more items from inventory 130 to be shipped to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a user has selected a pickup location, such as the pickup location described below with respect to FIG. 2, as the delivery destination, the item(s) of one or more shipment sets may be picked at the picking operation 140 directly into delivery containers. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers. The delivery container may also include a unique identifier, such as a bar code, QR code, unique number, etc. to enable tracking and identification of the delivery container and association of items placed in the delivery container. For example, during a picking operation, an agent within the materials handling facility may scan the bar code of the delivery container and scan a barcode or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the pickup location upon retrieval of the item, or otherwise made available to a user.

Regardless of the type of delivery container utilized, in some implementations, items for which a pickup location has been selected as the final delivery destination do not need to be packed in a shipping package and can be transported to the pickup location in the delivery container. In other instances, items that are pre-packaged or fragile items that need additional protection prior to transport may be picked and transported to a pickup location in a delivery container. In another implementation, items may be put in bags prior to placement in the delivery container and/or storage compartment to provide confidentiality of the ordered items. In addition, items from multiple shipment sets destined for the same pickup location may be picked into the same delivery container for transport. As delivery containers are filled, an item routing operation 145 may route the filled delivery containers to the appropriate transporting operation 155 for transport to the designated pickup location. The item routing operation 145 may be manual or automated. The item routing operation 145 may receive an indication of the pickup location in which each item should be routed from a shipment planning system and route delivery containers to one of two or more transporting operations 170, from which they may be transported to the pickup location.

In other examples, for items not scheduled for delivery to a pickup location, picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. The package routing operation 165 may in various implementations be automated or manual. The package routing operation 165 may receive an indication of the destination to which each packed shipment set should be routed from a central control system. In some instances, the destination may be the final destination identified by the user or a pickup location at which transfer of a shipment set may occur for final delivery to the user. The package routing operation 165 may also determine a routing destination for each packed shipment set dependent on the size of a shipping package in which the shipment set is contained and/or based on whether the shipment set will be delivered directly to the user or be delivered to a pickup location at which transfer of the shipment set will occur for final delivery to the user.

The arrangement and order of operations illustrated by FIG. 1 is merely one example of many possible implementations of the operation of a materials handling facility, such as an order fulfillment facility, that enables transport of items directly to pickup locations without packing the items. Other types of materials handling, manufacturing, or order fulfillment facilities may include different, fewer, or additional operations and resources, according to different implementations.

Figure 2:
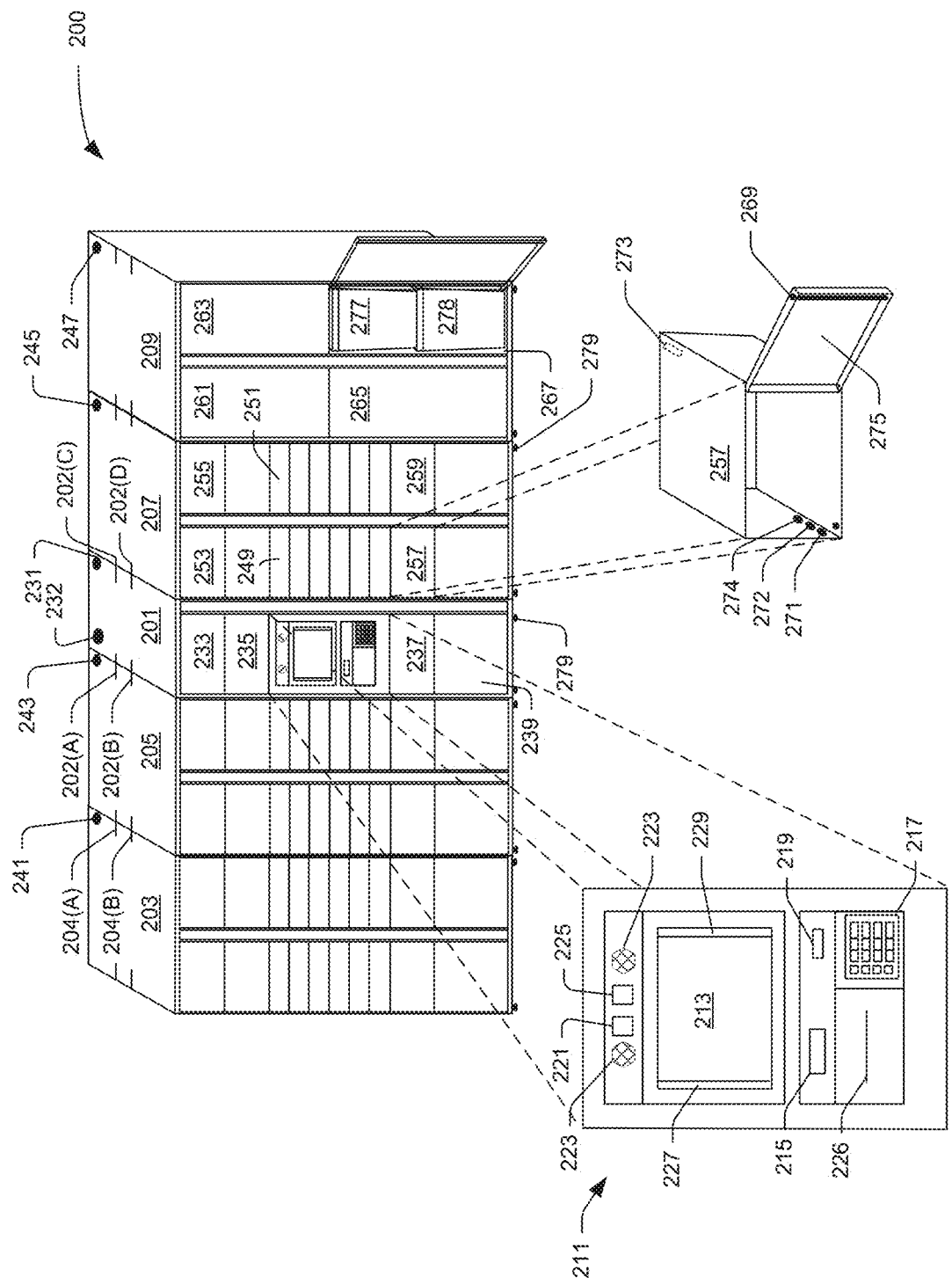
FIG. 2 depicts a block diagram of a pickup location, in one implementation.
Figure 3:
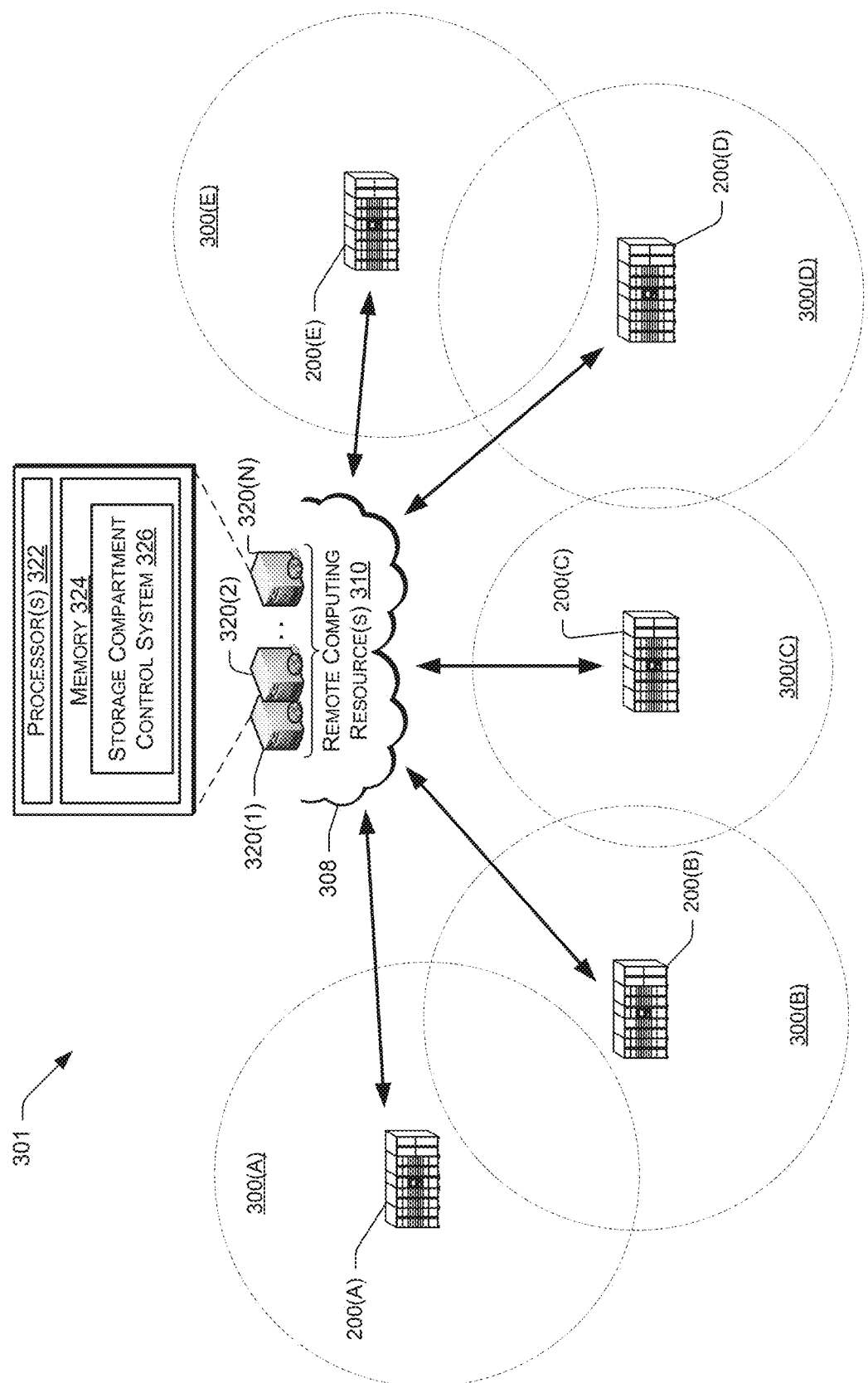
FIG. 3 depicts a block diagram of an illustrative distributed pickup location environment, in one implementation.

FIG. 2 depicts a block diagram of a pickup location 200, in one implementation. The pickup location 200 may include one or more control stations 201 and one or more storage compartment modules 203, 205, 207, 209. The control station 201 acts as the central control point for the pickup location 200, providing power, computing resources, user input and network access to the pickup location 200. For example, control station 201 may include an internal computing system (not shown), such as a computing system described below with respect to FIG. 12, or other computing system, that is capable of maintaining state information for each storage compartment at the pickup location 200 and providing other computing functions. For example, the internal computing system may include a command component that maintains information as to which storage compartments of the pickup location 200 are empty, which storage compartments include items, the access code(s) or other identifier(s) necessary to open each of the storage compartments and any other information necessary to maintain the pickup location. The command component may also issue commands or instructions to the storage compartment modules to lock/unlock storage compartments, active sensors, and the like. The pickup location 200 may be configured to obtain information from a remote computing resource, shipment planning system, capacity planning system or material handling facility or may be configured to operate primarily as a stand-alone unit, with limited external communication to provide capacity information and/or to receive/provide order/delivery/retrieval/transfer information. FIG. 3, described below, illustrates an example of an environment in which a centralized control system is provided for remotely communicating with a group of geographically distributed pickup locations 200.

The control station 201 may also include a user interface 211. The user interface 211 is configured to receive and provide information to one or more users of the pickup location 200 and may include, but is not limited to, a display 213, such as a touch-screen display, a scanner 215, a keypad 217, a biometric scanner 219, an audio transducer 221, one or more speakers 223, one or more image capture devices 225, such as a video camera, and any other types of input or output devices that may support interaction between the pickup location 200 and one or more users. For example, the user interface 211 may also include a credit card reader, the ability to accept money (such as cash or coins) and/or the ability to vend items (e.g., stamps, labels, envelopes, shipping packages) using a vending slot 226. Providing the ability for the pickup location 200 to accept credit cards and/or money enables the delivery of orders to a storage compartment at the pickup location 200 for which the items are paid for at the time of pickup (e.g. cash on delivery). Likewise enabling vending of items, such as stamps or envelopes, supports the ability for users to utilize a pickup location to ship or deliver goods, as described in more detail below.

In addition to including user input and output devices, the user interface 211 may also include the ability to collect particulates, such as for use in detection of hazardous (e.g., explosives) or banned substances (e.g. drugs). In one implementation, the user interface 211 may include a particulate sensor that includes a forced air ejection component 227 and an air intake component 229. The air ejection component expels air from a left side of the display 213 while a user is interacting with or otherwise within a predetermined range of the display 213. Opposite the air ejection component 227, the air intake component 229 collects the ejected air and any particulates that are collected as the air passes over the display 213 and past the user's hand or fingers as they interact with the display 213. Collected particulates may be scanned or otherwise processed to determine if potentially hazardous or banned substances may be placed in a storage compartment using any known particulate testing technique. If particulates indicating the potential presence of hazardous or banned substances are detected, the control station 201 may determine to not open a storage compartment door, may alert the authorities, or take other protective actions (such as shutting down the pickup location or performing additional tests).

The control station 201 may also include a connector component configured to provide wired and/or wireless network connectivity with the other storage compartment modules 203, 205, 207, 209, as well as to remote computing devices (FIG. 3) or materials handling facilities. Wireless connectivity may be implemented using a wireless antenna 231, which may provide both receive and transmit functionality. Power and/or network communication with remote computing devices may be obtained from a main access point 232. In addition, in some implementations, the control station 201 may include one or more storage compartments 233, 235, 237, 239. As described in more detail below with respect to the storage compartment modules 203, 205, 207, 209, the storage compartments 233, 235, 237, 239 of the control station 201 may be of any size or configuration. As with each of the other storage compartments, the storage compartments 233, 235, 237, 239 of the control station 201 may include an automated locking mechanism, image capture device, a motion or presence detection mechanism, temperature sensor, etc. Alternatively, in some implementations one or more of the storage compartments may be utilized as an additional user interface. For example, storage compartment 239 may be removed and the space remaining may be utilized to provide a scale or other type of weight determination component to allow users to weigh items for shipment, determine the cost necessary to ship the item, and pay for shipping using the user interface 211.

The control station 201 may include one or more connector components 202(A), 202(B), 202(C), 202(D) to which a storage compartment module, such as storage compartment module 205 or storage compartment module 207 may connect with the control station 201. For example, connector component 202(A) may provide power to storage compartment module 205, connector component 202(B) may provide communication with storage compartment module 205, connector component 202(C) may provide power to storage compartment module 207 and connector component 202(D) may provide communication with storage compartment module 207. Likewise, the storage compartment modules may also include one or more connector component, such as connector component 204(A), 204(B) to provide power and connectivity to additional storage compartment modules, such as storage compartment module 203.

Each storage compartment module, such as storage compartment modules 203, 205, 207, 209, may be configured so the pickup location 200 is modular, such that one or more storage compartment modules can be easily removed or added to the control station 201 of the pickup location 200. The ability to add or remove storage compartment modules at a pickup location 200 supports the ability to easily and quickly expand or remove capacity so that the demand for that pickup location can be satisfied. For example, during the Christmas holiday season, additional storage compartment modules may need to be added to the pickup location 200 to support the increased demand of items ordered by users. As storage compartment modules 203, 205, 207, 209 are added or removed from a pickup location 200, the control station 201 informs the warehouse management system and/or a capacity planning system of the added or removed capacity.

Each storage compartment module 203, 205, 207, 209 includes one or more storage compartments, one or more receptor components for connecting with connector components of a control station 201 (or another storage compartment module) and one or more connector components for allowing other storage compartment modules to connect thereto, thereby providing power and/or connectivity with the control station 201. The storage compartments of each storage compartment module may be of varying sizes and number. As such, storage compartment modules with different storage compartment sizes can be added to a pickup location 200 to optimize the storage compartment configuration to match that of the sizes of orders typically scheduled for delivery to the pickup location.

Figure 12:
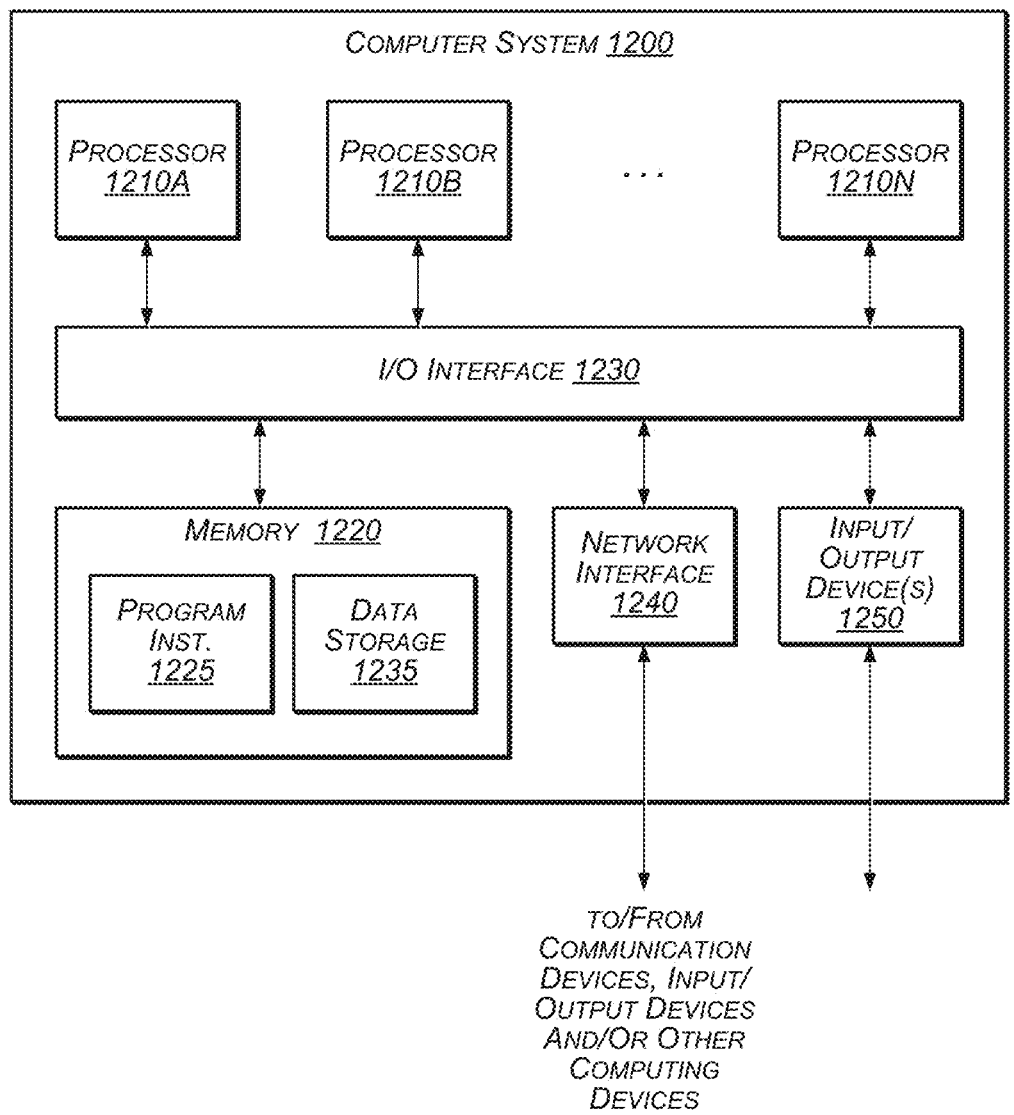
FIG. 12 is a block diagram illustrating an example computer system configured to implement one or more of the systems or processes described herein.

In addition to including storage compartments, power and connectivity points, the storage compartment modules 203, 205, 207, 209 may also include one or more wireless antennas 241, 243, 245, 247 and one or more computing systems, such as the computing system described with respect to FIG. 12, or a simpler computing system such as a printed circuit board, RFID tag, or anything else that may be detectable by the control station 201 and used to identify the storage compartment module. The computing component(s) of each storage compartment module may include a unique identifier of the storage compartment module and configuration information of the storage compartment module, which includes dimension information and location information of each storage compartment of the storage compartment module. The computing component may also include a storage compartment management component configured to control the actuators that enable locking and unlocking of the storage compartment doors of the storage compartment module 203, 205, 207, 209 in response to receiving commands or instructions from a command component of the control station 201.

A storage compartment module, such as storage compartment module 207, when added to a control station 201 and power is applied, provides information to the control station 201 identifying the storage compartment module 207, the number, location, and dimensions of each storage compartment of the storage compartment module and any other configuration or information necessary to enable the control station 201 to control the storage compartment module 207. As illustrated by the comparison between storage compartment module 207 and storage compartment module 209, each storage compartment module may have a variety of different configurations, sizes and numbers of storage compartments. For example, storage compartment module 207 includes a group of small storage compartments, such as small storage compartments 249, 251, a group of medium-sized storage compartments, such as medium-sized storage compartments 253, 255 and a group of larger storage compartments, such as larger storage compartments 257, 259. In contrast, storage compartment module 209 includes four very large storage compartments 261, 263, 265, 267. It will be appreciated that any number, size and configuration of storage compartments of a storage compartment module may be utilized with the various implementations described herein.

In an alternative implementation, rather than providing all of the information from the storage compartment module to the control station 201, the storage compartment module 207 may only provide limited information, such as an identifier, to the control station 201. The control station 201, upon receiving the limited information from an added storage compartment module 207, may make a request to a remote computing system, such as a capacity planning system, and obtain information about the configuration, number and sizes of the storage compartments of the added storage compartment module 207.

The control station 201, upon receiving identifying information of an added storage compartment module 207, may allocate the added capacity to the pickup location 200, and may inform a remote computing resource such as will be described in more detail below with respect to FIG. 3. In various implementations, the added storage compartment module may act as a slave component for the control station, receiving instructions (e.g., open storage compartment, close storage compartment, activate image capture device, monitor motion sensor) from the command component of the control station 201 and providing responses (e.g., closed-door, closed, open-door, object/movement detected) to the control station 201 via the storage compartment management component.

Each storage compartment of a storage compartment module 203, 205, 207, 209 or control station 201 includes an upper, bottom, side and rear surfaces and at least one door configured to form a cavity in which items may be stored. In addition, each storage compartment may include various security or other components. For example, looking at the expanded view of storage compartment 257, disposed within the cavity the storage compartment may include a locking mechanism 269, which may be controlled remotely by the command component of the control station 201 via the storage compartment management component, a presence detection sensor 271, motion sensor 272, an image capture device 273, a temperature sensor 274, and a mirror (or other reflective surface) on the top inside of the storage compartment unit (not shown). The locking mechanism 269 may be controlled by the control station 201, either through wired or wireless communication with the storage compartment management component, to effect locking and unlocking of the door 275 of the storage compartment 257. For example, when a user interacts with the control station 201 via the display 213 and provides an access code or other identifier, the control station 201 may identify a specific storage compartment associated with the access code or other identifier and the command component may wirelessly send instructions to the storage compartment management component of the storage compartment module 207 to unlock a storage compartment 257. The instructions may include a command (e.g., unlock), an address or identifier of the specific storage compartment and any other information necessary for communication between the control station 201 and the storage compartment module 207. In response to receiving the instructions from the command component, the storage compartment management component of the storage compartment module 207 may activate a locking mechanism that moves the pins of the locking mechanism 269 on the door 275 of the identified storage compartment 257 such that the pins retract, thereby disengaging the lock of the storage compartment 257 allowing the door 275 to open. In some implementations, the storage compartment 257 may also include a spring mechanism (not shown) such that when the locking mechanism 269 of the storage compartment 257 is disengaged, the spring mechanism propels the door 275 outward, thereby identifying to a user that the door 275 is unlocked and the storage compartment 257 is accessible.

While the locking mechanism described above utilizes retractable pins, any mechanical, magnetic, electrical or other form of locking mechanism may be utilized with the various implements described herein. In addition, the storage compartment 257 may also include magnets to help retrieve and close a door when it is not all the way closed. Also, the locking mechanism of different storage compartments and different storage compartment modules may be the same or different. Moreover, while the above example describes sending instructions from the command component of the control station 201 to the storage compartment management component of the storage compartment module, in other implementations, each storage compartment may be controlled and/or communicated with directly by the control station 201 and/or the command component and/or remote computing resources as will be described in more detail below with respect to FIG. 3.

The presence detection sensor 271 may be used to detect the presence or absence of objects in the storage compartment 257. For example, the presence detection sensor 271 may be utilized when a carrier or user is placing items, delivery containers and/or transfer containers in the storage compartment 257 to confirm that the item is indeed in the storage compartment 257 before the door 275 is closed and locked by the locking mechanism 269. Additionally, the presence detection sensor 271 and/or motion sensor 272 may also be used when a user is picking up an order stored in the storage compartment 257 or when a carrier is removing items, delivery containers and/or transfer containers from the storage compartment 257. For example, when a user interacts with the control station 201 via the touch control display 213 and provides an access code such that a storage compartment 257 is opened, the presence detection sensor 271 and/or motion sensor 272 may be used to confirm that a user has reached into the storage compartment 257 and removed its contents (or added items in the case of returns or shipping), prior to allowing the storage compartment door 275 to be closed and locked with the locking mechanism 269. In some implementations, there may be multiple presence detection sensors 271 and/or motion sensors 272 distributed throughout the inside of a storage compartment to ensure objects/motion is detected. In still another implementation, the bottom of the storage compartment may include protrusions or rises to position thin items so they are detected by the presence detection sensor 271.

The storage compartments, such as storage compartment 257, may also include an image capture device 273, such as a camera, and optionally an illumination component (not shown), such as a light emitting diode (LED), that may be used to illuminate the inside of the storage compartment 257. The image capture device 273 may also be used to the detect presence or absence of items within the storage compartment 257, detect the item itself, for example to simplify returns, as well as for security. For example, the image capture device 273 may be used to identify the type of object located within the storage compartment 257 and/or to identify or record video/images of access with the storage compartment 257. In addition, the image capture device 273 may be used to determine the amount of space available in the storage compartment 257. For example, an image taken by the image capture device 273 may be transmitted via wired or wireless communication to the control station 201 and the control station 201 may determine the amount of space available in the storage compartment 257. Such information may be used to determine if all items of a shipment set will fit in a single storage compartment 257, if all items associated with a storage compartment are present in the storage compartment, or if the shipment set needs to be divided across multiple storage compartments. In addition, the image capture device 273 may also be used to determine if there is sufficient space in a storage compartment 267 to contain a delivery container 277 and/or transfer container 278.

Some storage compartments, such as storage compartments located vertically higher within a storage compartment module 203, 205, 207, 209 or the control station 201, such as storage compartments 233, 235, 253, 255 may also include a reflective surface, such as a mirror, on the inside top, sides and/or back of the storage compartment to enable a user who cannot see directly into the storage compartment to determine via a reflection off the reflective surface whether they have removed all of the items from the storage compartment. In a similar manner, a reflective surface may be included on the bottom, sides or back of a storage compartment, such as storage compartment 239, located lower within a storage compartment module 203, 205, 207, 209 or the control station 201, so users can determine via a reflection, and without having to bend all the way down to see into the storage compartment, whether all items have been removed.

The image capture device 273 may also be used to determine if all of the items have been removed from the storage compartment 257. For example, a current image taken by the image capture device 273 may be compared to a prior image taken when the storage compartment 257 was empty in order to verify that all of the items have been removed from the storage compartment. In one implementation, the current image taken by the image capture device 273 may be transmitted via wired or wireless communication to the control station 201 and the control station 201 may compare the current image to a stored image of the empty storage compartment 257 using image processing software to determine if all of the items have been removed. For example, when a user closes the door of the storage compartment 257 after removing some items, the control station 201 may use the current image from the image capture device 273 to automatically detect and provide a warning to the user if there are items remaining in the storage compartment 257.

Some storage compartments, such as any of the storage compartments located within a storage compartment module 203, 205, 207, 209 or the control station 201, may be refrigerated storage compartments. In various implementations, such refrigerated storage compartments may include their own cooling mechanisms, or may rely on those of neighboring refrigerated storage compartments to which they are environmentally coupled, or alternatively each of the modules 201, 203, 205, 207, 209 or the entire pickup location 200 may have a centralized cooling system. The temperature of previously non-refrigerated storage compartments may be adjusted to become refrigerated storage compartments, and visa-versa. The temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be stored in various refrigerated storage compartments.

In various implementations, the temperatures in the refrigerated storage compartments may be adjusted when items are delivered to be placed in the refrigerated storage compartments, or may adjusted in advance. For example, when a refrigerated item is scheduled to be delivered to a pickup location, the temperature of a refrigerated storage compartment may be adjusted to a temperature that is specified for the refrigerated item in advance so that the refrigerated storage compartment will be at the specified temperature when the item is delivered. In one implementation, the image capture device 273 may be used to capture an image of an item when it is delivered and/or placed in a storage compartment in order to try to determine an appropriate storage temperature for the item. For example, an item may have information on a label which identifies a storage temperature, such as "contents to be stored at 32 degrees F. or lower".

The temperatures in some or all of the refrigerated storage compartments may be controlled by the control station 201. Continuous monitoring and regulating of the temperatures of the refrigerated storage compartments in which such items are kept may be important for verifying the condition of the items. Temperature sensors, such as the temperature sensor 274 of the storage compartment 257, may be utilized for monitoring and regulating the temperature inside each of the refrigerated storage compartments. The refrigerated storage compartments and/or the entire pickup location 200 may be insulated to prevent the dissipation of the cooled air from the refrigerated storage compartments.

In another example, the pickup location 200 may also include a storage compartment module configured as a drop-box (not shown). Rather than utilizing specific storage compartments of the pickup location 200 to store returned items and/or items for delivery, a storage compartment module configured as a drop-box may be utilized to securely store such items. For example, a drop-box may be configured with a pivoting door or tray that allows items to be placed in the drop-box but not retrieved without having additional access to the drop-box. In some examples, the pivoting door or other form of access may also be locked and access only provided in response to a user interacting with the user interface 211, such as selecting to return an item.

The storage compartment modules 203, 205, 207, 209 as well as the control station 201 may also include self-leveling feet 279 that may be used to level the storage compartment modules 203, 205, 207, 209 and/or control station 201 when located on un-level surfaces. In addition, the self-leveling feet 279 may also be adjusted so that a storage compartment module, such as storage compartment module 205, 207, can be positioned so it is flush and aligned with a control station 201 or another storage compartment module. As an alternative to self-leveling feet 279, any other type of support mechanism may be utilized with various implementations described herein for supporting the control station 201 or any storage compartment module 203, 205, 207, 209. Also, the control station 201 and one or more of the storage compartment modules 203, 205, 207, 209 may utilize different types of support mechanisms. For example, the control station 201 may utilize self-leveling feet while the storage compartment modules 203, 205, 207, 209 may utilize rolling casters or wheels. The casters/wheels may further enable the ease with which storage compartment modules may be added or removed from a control station 201, thereby allowing the easy addition/removal of capacity at the pickup location 200.

FIG. 3 depicts a block diagram of an illustrative distributed pickup location environment 301 that includes a group of distributed pickup locations 200(A), 200(B), 200(C), 200(D), 200(E), in one implementation. A group of corresponding geographic ranges 300(A), 300(B), 300(C), 300(D), 300(E) are served by each pickup location 200(A)-200(E). When an order for one or more items is placed by user, a shipment set may be assigned to a materials handling facility for fulfillment and delivery to the user. By strategically placing pickup locations 200, a user may select a pickup location, such as pickup location 200(A) that is in a geographically convenient location 300(A) as the delivery destination, rather than having the order delivered to their house, apartment, office or other location. This may be convenient to the user if they may not be available when the item would otherwise be delivered to the location, may not want others located at alternative delivery locations to know that they have ordered an item (e.g., a mother may not want a gift for their child delivered to the house) or may not want the item left at an unsecure location (e.g., front port, mailroom) if they are not present when the item is delivered.

When a user places an order for one or more items, an order planning system may determine if there is a pickup location, such as pickup location 200(A), within a geographic range 300(A) of where the user may wish to have the items delivered. In some instances, a user may designate or preselect preferred pickup locations 200, such as pickup location 200(A), 200(B). For example, a user may designate one pickup location 200(A) as a preferred pickup location near the user's home and a second pickup location 200(B) as a pickup location near the user's work. If an identified pickup location is available, the order planning system may determine if there is available capacity to receive the user's order prior to allowing the user to select the pickup location for delivery of an order. For items that have been ordered with a pickup location 200 designated as the delivery location, the materials handling facility 301 may prepare and ship the orders to each of those pickup locations, in some instances without requiring packaging for those orders. For example, orders assigned to pickup location 200(A) may be picked directly into one or more delivery containers, transported to the pickup location 200(A), placed in storage compartments of the pickup location 200(A) and made available for retrieval by the users. In various implementations, carriers may be utilized for delivering items to, or removing items from, the pickup location 200(A). For example, a carrier may be associated with a company that transports goods, or an attendant or owner of a pickup location, or any other person or entity that is authorized to deliver items to, or remove items from, the pickup location 200(A).

In various implementations, the pickup locations 200(A), 200(B), 200(C), 200(D), 200(E) may communicate with one or more remote computing resources 310. The remote computing resources 310 may form a portion of a network-accessible computing platform implemented as a computing infrastructure of processors, storage, software, data access, and other components that is maintained and accessible via a network 308. The pickup locations 200(A), 200(B), 200(C), 200(D), 200(E) may communicatively couple to the remote computing resources 310 via the network 308 which may represent wired technologies (e.g., wires, USB, fiber optic cable, etc.), wireless technologies (e.g., RF, cellular, satellite, Bluetooth, etc.), and/or other connection technologies. The network 308 carries data between the pickup locations and the remote computing resources 310. For example, the communication to and from the pickup locations may utilize the main access point 232 and/or the wireless antennas of the pickup locations, such as the wireless antennas 241, 243, 231, 245, 247 described above with respect to FIG. 2. Communication may be to and from the command component of the control station for each of the pickup locations, such as the control station 201, and may also be to and from the storage compartment management components of each connected storage compartment module, such as the storage compartment modules 203, 205, 207, 209.

As illustrated, the remote computing resources 310 may include one or more servers, such as servers 320(1), 320(2), . . . , 320(N). These servers 320(1)-(N) may be arranged in any number of ways, such as server farms, stacks, and the like that are commonly used in data centers. Furthermore, the servers 320(1)-(N) may include one or more processors 322 and memory 324 which may store a storage compartment control system 326.

The storage compartment control system 326 may be configured, for example, to communicate with the pickup locations 200(A), 200(B), 200(C), 200(D), 200(E). In various implementations, the general activities of the pickup locations, including the delivery and retrieval of items to and from the storage compartments, may require synchronization or other communications with the storage compartment control system 326 and/or other entities such as carriers and users. For example, when an order for an item is placed by a user, and a pickup location where the item will be delivered is selected, as will be described in more detail below with respect to FIG. 4, the storage compartment control system 326 may send certain order data to the control station 201 of the respective pickup location 200(A). By sending the order data before the item is delivered, which may include elements such as an expected tracking identification for the item, the control station 201 at the pickup location is able to store the order data and process the item when it is delivered, even if the control station is not able to communicate over the network when the item is delivered. More specifically, when a carrier delivers the item to the pickup location and scans the tracking identification for the item at the control station 201, the item can be recognized and processed accordingly, without requiring the control station to send a data pull request for coordinating the tracking identification with the respective order.

As another example, the control station 201 of the pickup location 200(A) may also require communication over the network for performing certain processes related to returns of items by users. For example, with regard to the return of an item, a user may bring the item to the pickup location 200(A) and place it in a storage compartment from which it will be retrieved by a carrier who will deliver it back to a materials handling facility. A request for the carrier to come to the pickup location 200(A) to retrieve the item will typically not be sent until the user has delivered the item to the pickup location. One reason for this is that it may be unknown exactly when or if the user will deliver the item to the pickup location. In various implementations, the request for the carrier to retrieve the item from the pickup location may be sent in different ways. For example, the retrieval request may be sent directly to the carrier from the control station 201, or may be sent in the form of a message or synchronization with the storage compartment control system 326 which indicates that the item has been delivered by the user to the pickup location and is ready for retrieval, in response to which the storage compartment control system 326 may communicate with the carrier to schedule the retrieval. Regardless of how the retrieval request is made, if communication over the network is not available when the item is delivered to the pickup location by the user, the control station 201 will not be able to send the information for indicating that the item is ready for retrieval. As an alternative, the control station 201 may be enabled to provide the item to a carrier who has arrived at the pickup location for other reasons without having received a request to retrieve the item. For example, the control station 201 may have an access code stored in memory that was previously provided to a carrier, and may associate that access code with the item. When the carrier arrives and enters the access code on an input device of the control station 201, such as to retrieve another item or for a daily pickup, the storage compartment, as well as any other storage compartments associated with the access code, may be opened so that the carrier can retrieve the items from the storage compartments.

As another example, an access code may also be synchronized between the control station 201 and the storage compartment control system 326 before the item is delivered to the pickup location 200(A). In one implementation, if the access code is to be generated by the control station 201, it can be done ahead of time and synchronized before the item is delivered to the pickup location 200(A). In this manner, if communication with the control station 201 is not available when the item is delivered to the pickup location, the storage compartment control system 326 will still be able to include the access code in a message that is sent to the user or carrier. For example, when the item is ready for pickup by the user, the storage compartment control system 326 may send a message to the user that includes the access code. Alternatively, if the access code is to be generated by the storage compartment control system 326 or the user or carrier, then the access code can be sent by the storage compartment control system 326 and/or to the control station 201 ahead of time before the item is delivered to the pickup location 200(A). In this manner, if communication with the control station 201 is not available when the item is delivered, the control station 201 will still be able to associate the access code with the proper storage compartment and activate the access code for use by the user or carrier.

In various implementations, during the time that the control station 201 is not able to communicate over the network, data regarding new orders or returns may not be synchronized, and thus new orders or returns cannot be accepted or processed at the pickup location. However, the ability of the control station 201 to process previously synchronized and planned deliveries and retrievals of items, allows the pickup location 200(A) to continue to function for performing these services even in the event of a network outage.

As will be described in more detail below with respect to FIGS. 6 and 11, the storage compartment control system 326 may also store and utilize certain reliability data related to a confidence threshold for specific carriers. More specifically, when communication with a control station 201 is not available, such that a delivery or retrieval confirmation for an item is not able to be received from the control station 201, a delivery or retrieval confirmation may instead be received from a carrier. In such a case, a determination may be made as to whether a confidence threshold has been met before a message is sent to a user that the item is available for pickup, or before issuing a refund or replacement for the item, or before updating storage capacity information for the pickup location. As part of the determination for whether a confidence threshold has been met, the storage compartment control system 326 may evaluate certain historical data regarding the performance of the carrier. For example, a correlation may be made between the number of times that a carrier has provided a delivery or retrieval confirmation as compared to the number of times that it has been confirmed that an item was actually delivered to or retrieved from the pickup location. If the carrier has a high level of correspondence between the number of times they send a retrieval confirmation and the number of times the item was actually retrieved, then the confidence threshold for the carrier may be met, such that when a retrieval confirmation is received from the carrier, a refund or replacement process may be initiated and/or the storage capacity information for the pickup location may be updated. Similarly, if the carrier has a high level of correspondence between the number of times they send a delivery confirmation and the number of times the item was actually delivered, then the confidence threshold for the carrier may be met, such that when a delivery confirmation is received from the carrier, a message will be sent to the user that the item is available for pickup. In some instances, a correlation may also be made between the delivery of an item and the delivery of other items that were being transported by the carrier at the same time. For example, if a carrier is known to be transporting a group of items, and a confirmation has been received that some of the items have been delivered, that confirmation may provide greater confidence that the other items may have also been delivered.

In various implementations, the remote computing resources 310 are able to receive delivery or retrieval confirmations from a carrier even when communications are not available with the control station 201. For example, a carrier may utilize a different network and/or communication system than the control station 201. In one implementation, the carrier may utilize a mobile computing device to send a delivery or retrieval confirmation over a wireless network to the remote computing resource once the item is delivered. In another implementation, when the carrier records a delivery or retrieval confirmation, the relevant data may be uploaded either wirelessly or else through a wired connection to a home system for the carrier, which may then send a delivery or retrieval confirmation to the remote computing resource.

Figure 4:
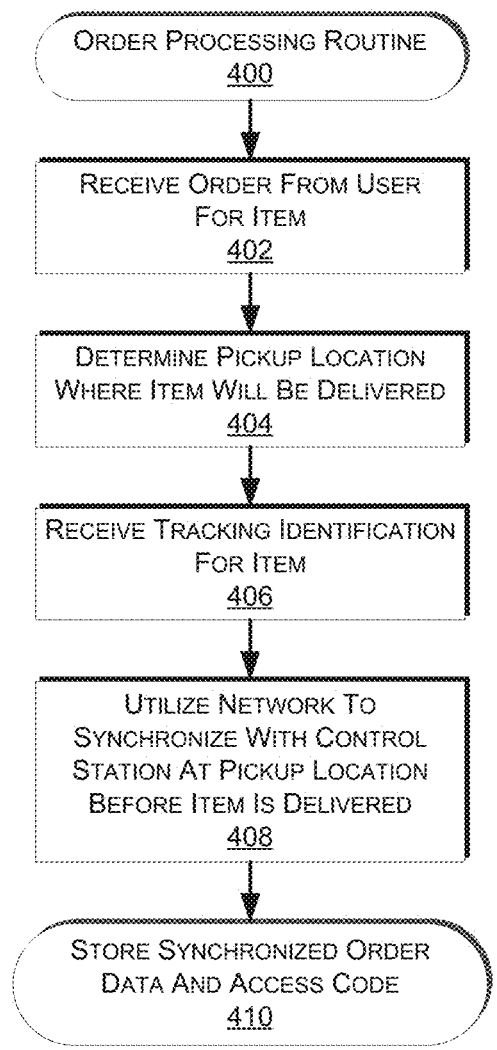
FIG. 4 is a flow diagram illustrating an example process for processing a user order for an item.

FIG. 4 is a flow diagram illustrating an example process 400 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins with the receipt of an order from a user for an item, as in 402. When the order is placed, a determination is made as to what pickup location the item will be delivered to, as in 404. In various implementations, a user may select the pickup location where the item is to be delivered based on which pickup location is most convenient for the user. In addition, one or more pickup locations may be suggested to, or selected for, a user based on factors such as proximity to a stored delivery address, past use of certain pickup locations, preferences stored by the user for certain pickup locations, current availability of certain pickup locations for receiving a delivery, etc. Once the pickup location where the item will be delivered is determined, an expected tracking identification for the delivery of the item to the pickup location is received, as in 406. For example, a carrier may be contacted to schedule a delivery of the item to the pickup location, and the carrier may provide an expected tracking identification for the delivery of the item.

Once the expected tracking identification for the delivery of the item is received, a synchronization is performed with a control station at the pickup location, as in 408. The synchronization data may include elements such as order data including the expected tracking identification and an access code. In various implementations, the control station and remote computing resources may perform synchronization operations at regular time intervals, such as every ten minutes. Alternatively, synchronizations may be performed on demand, such as when certain new data that is to be synchronized becomes available.

Once the synchronization with the control station has been performed, the synchronized order data and access code are stored, as in 410. In various implementations, the synchronized order data may include information that will allow a carrier to deliver an item to the pickup location, even if communication with the control station is not currently available over the network when the item is delivered. For example, the synchronized order data may include the expected tracking identification for the item that was received at block 406, such that the carrier will be able to scan the tracking identification at the control station and have it recognized even if communication over the network is not currently available.

The access code that is included in the synchronization process may later be utilized by a user for retrieving the item from a storage compartment at the pickup location. In various implementations, the access code may include a unique identifier that is generated and/or provided by either the control station at the pickup location, a remote computing resource, or a user. For example, when an order for an item is placed by a user and a pickup location is selected, the control station at the pickup location may be requested to generate an access code for a storage compartment where the item will be delivered. In such an implementation, the access code may be generated and sent from the control station to a remote computing resource. As will be described in more detail below with respect to FIG. 6, at a later time when the item is delivered by a carrier to the pickup location, and a delivery confirmation is received from the carrier that the item has been delivered, the remote computing resource may send a message to the user that includes the access code. In such an implementation, the storing of the access code at the remote computing resource ahead of time allows the remote computing resource to include the access code in the message that is sent to the user, even if communication with the control station at the pickup location is not available when the item is delivered to the pickup location.

Alternatively, if the access code is generated and/or provided by either a remote computing resource or a user, during synchronization the access code may be sent to the control station at the pickup location. By storing the access code at the control station ahead of time, when the item is delivered by a carrier, the access code can be designated for the proper storage compartment and utilized by the user for retrieving the item, without requiring communication from the remote computing resource.

Figure 5:
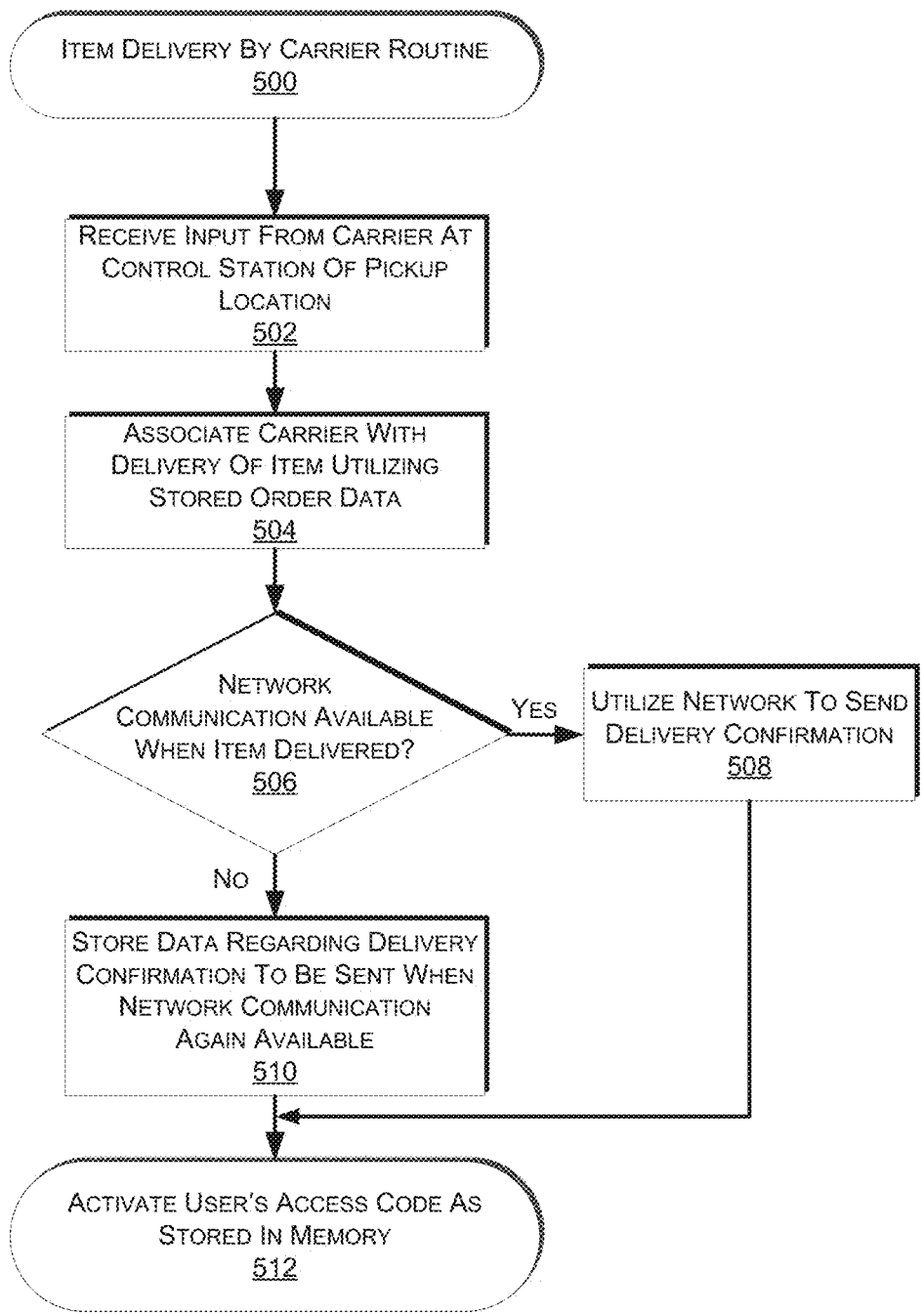
FIG. 5 is a flow diagram illustrating an example process for receiving an item delivered by a carrier at a pickup location.

FIG. 5 is a flow diagram illustrating an example process 500 for receiving an item delivered by a carrier at a pickup location. The example process begins when an input is received from the carrier at a control station of the pickup location, as in 502. For example, the input received from the carrier may include a tracking identification barcode, which may be scanned at the control station. As another example, the carrier may enter an identification code on the user interface of the control station.

After the input is received from the carrier at the control station, the carrier is associated with the delivery of the item utilizing stored order data, as in 504. For example, the stored order data may include an expected tracking identification for the item that is to be delivered. In various implementations, the order data may be stored in advance in order to avoid the need for communication over the network, such as a data pull request for the tracking identification, when the item is delivered to the pickup location.

After the carrier has been associated with the delivery of the item, a determination is made as to whether communication over the network is available when the item is delivered, as in 506. If it is determined that communication is available when the item is delivered, then the control station sends a delivery confirmation, as in 508. In one implementation, the sending of the delivery confirmation from a control station to a remote computing resource may be sufficient confirmation for the remote computing resource to send a message to a user that the item is available for pickup, as will be described in more detail below with respect to FIG. 6. In an alternative implementation, the delivery confirmation may be sent from the control station directly to the user. For example, the control station may send an electronic message, such as a text or email, to the user which indicates that the item has been delivered and is available for pickup.

If at decision block 506 it is determined that communication over the network is not available when the item is delivered, then data is stored at the pickup location regarding the delivery confirmation which will be sent to the remote computing resource and/or the user when the network communication is again available, as in 510. In various implementations, the stored delivery confirmation data may be utilized for various purposes. For example, if a message has not yet been sent from the remote computing resource to a user that the item is available for pickup, the message may be sent in response to the stored delivery confirmation being received by the remote computing resource. In addition, as will be described in more detail below with respect to FIG. 6, the receipt of a previously stored delivery confirmation may be utilized to increase a level of confidence in a carrier.

After the data regarding the delivery confirmation has been stored, or the network has been utilized to send the delivery confirmation, the user's access code for retrieval of the item is activated, as in 512. By only activating the user's access code after the item is delivered into a storage compartment at the pickup location, possible user confusion is avoided regarding attempts to retrieve the item before it has arrived. In addition, the storing of the user's access code in memory allows the process for activating the access code to be performed by the control station without requiring that communication over the network be available for receiving the access code when the item is delivered.

Figure 6:
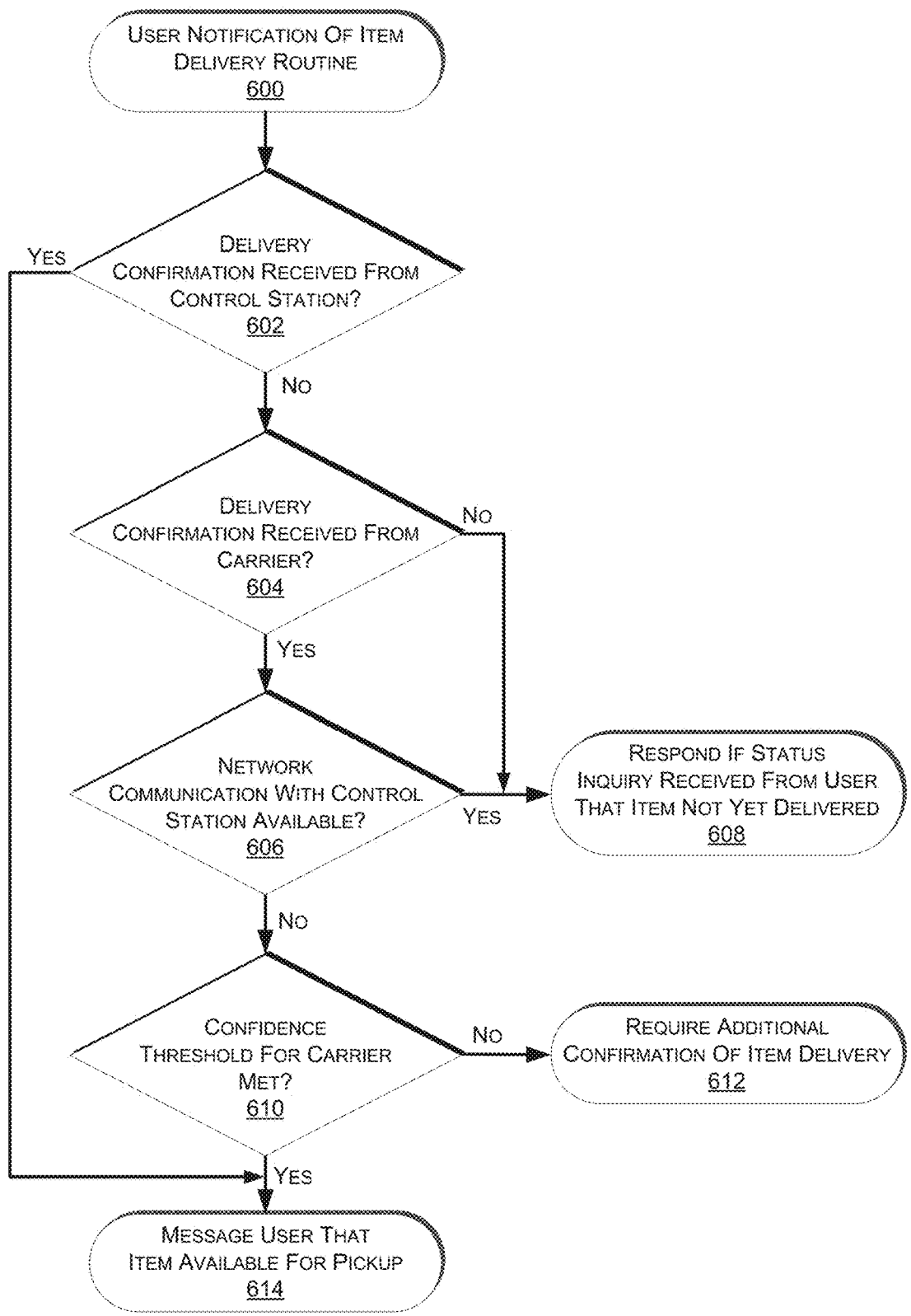
FIG. 6 is a flow diagram illustrating an example process for notifying a user that an item is ready to be retrieved from a pickup location.

FIG. 6 is a flow diagram illustrating an example process 600 for notifying a user that an item is ready to be retrieved from a pickup location. The example process begins with a determination of whether a delivery confirmation has been received from a control station at a pickup location, as in 602. As described above with respect to FIG. 5, when communication is not available with a control station when an item is delivered, the control station is not able to send a delivery confirmation. If at decision block 602 it is determined that a delivery confirmation has been received from a control station at the pickup location, then the user is sent a message that the item is available to be retrieved from the pickup location, as in 614. The message may also include the access code that the user may utilize for retrieving the item from the storage compartment at the pickup location.

If at decision block 602 it is determined that a delivery confirmation has not been received from the control station, then a determination is made as to whether a delivery confirmation has been received from a carrier, as in 604. For example, even when communication with a control station at a pickup location is not available, carriers often utilize other means for sending a delivery confirmation, such as entry of the confirmation at a website, sending the confirmation through other electronic messaging systems, etc. If at decision block 604 it is determined that a delivery confirmation has been received from a carrier, then a determination is made as to whether network communication is available with the control station, as in 606.

In various implementations, the determination as to whether network communication is available with the control station may be made in various ways. For example, in one implementation, a communication check may be performed on demand, wherein a communication check signal is sent to the control station, and a response indicates that network communication is currently available. In an alternative implementation, the determination may be made based on an evaluation of when the last successful synchronization with the control station was performed. For example, in an implementation where a synchronization with the control station is performed every 10 minutes, if a period of longer than 10 minutes has elapsed since the last successful synchronization, this may indicate that network communication with the control station is not available. Conversely, in such an implementation if the last synchronization was successfully performed less than 10 minutes ago, this may indicate that network communication with the control station is available. If at decision block 606 it is determined that network communication is available at a time when no delivery confirmation has been received from the control station, or if at decision block 604 it is determined that no delivery confirmation has been received from a carrier, then if a user makes a status inquiry regarding the item, the user is informed that the item has not yet been delivered, as in 608.

If at decision block 606 it is determined that network communication is not available with the control station at a time when a delivery confirmation has been received from the carrier, a determination is made as to whether a confidence threshold for the carrier has been met, as in 610. If at decision block 610 it is determined that a confidence threshold has not been met, then additional confirmation of the delivery of the item is required, as in 612. For example, an additional confirmation of the delivery of an item may be provided from an attendant at the pickup location who communicates over a different network than the control station, or a second carrier, or the control station itself if network communication with the control station that was previously unavailable is restored. If at decision block 610 it is determined that the confidence threshold has been met, then the user is sent a message that the item is available for pickup, as in 614.

In various implementations, the confidence threshold may indicate a level of confidence that is associated with a particular carrier, which may be based at least in part on past delivery performance of the carrier. For example, over time as delivery confirmations are received from a carrier, a record may be kept of whether corresponding delivery confirmations are received from control stations. If there is a high level of correlation, then a high confidence level may be associated with the carrier. When a high confidence level is associated with a carrier, and when the only delivery confirmation that is received is from the carrier, it may be determined if the confidence threshold has been met. In various implementations, the confidence threshold may be based on a specific percentage of correlation between delivery confirmations received from control stations and delivery confirmations received from a carrier, such as at least a 98% correlation.

In various implementations, the confidence threshold may be made to vary depending on a variety of factors. In one implementation, the confidence threshold may be made higher or lower depending on the urgency associated with the item being picked up by the user. For example, the confidence threshold may be made to be lower for high volume, expensive or perishable items for which there may be a greater urgency for pickup. In another implementation, the confidence threshold may be made to depend on factors associated with the user. For example, if the user is already scheduled to be going to the pickup location for retrieving another item, the required confidence threshold may be made to be lower. A user may also be given an option to select whether they would like a confidence threshold to be set higher or lower.

Figure 7:
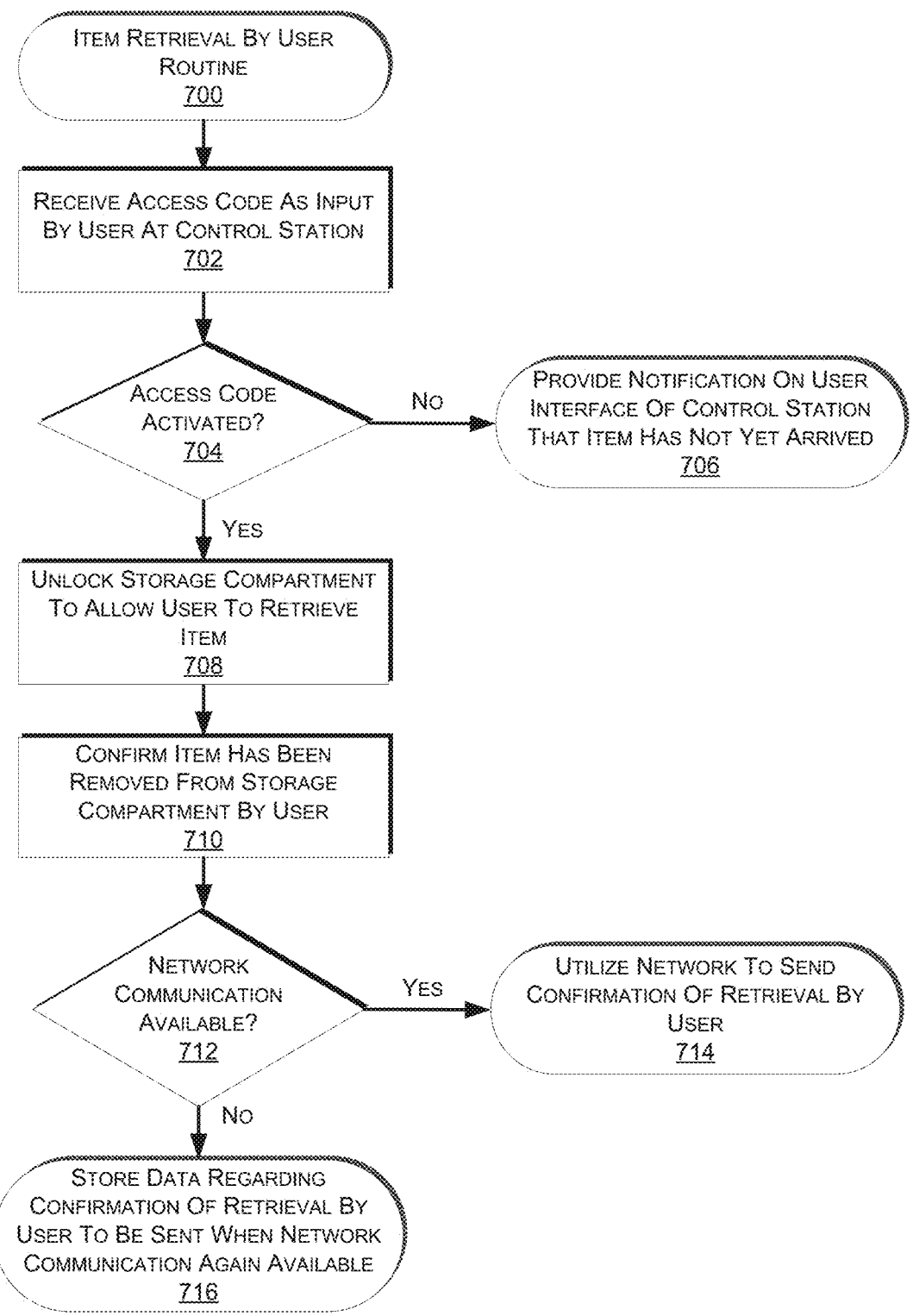
FIG. 7 is a flow diagram illustrating an example process for a user retrieving an item from a pickup location.

FIG. 7 is a flow diagram illustrating an example process 700 for a user retrieving an item from a pickup location. The example process begins with the receipt of an access code as input by a user at a control station of the pickup location, as in 702. The access code may include a unique identifier, such as a PIN that may be input by the user on a user interface of the control station and/or scanning of a barcode, QR code, etc. The access code may have been provided to the user as part of a message indicating that the item is available to be retrieved from the pickup location.

Once the access code as input by the user is received, a determination is made as to whether the access code has been activated, as in 704. As described above with respect to FIG. 5, the access code may have been previously stored in the memory of the control station, and activated when the item was delivered to the pickup location. If at decision block 704 it is determined that the access code has not been activated, then a notification is provided on the user interface of the control station that the item has not yet arrived, as in 706. In various implementations, the notification may also provide other information to the user. For example, if an estimated date or time for the delivery of the item is known, that information may be provided. In an implementation where the user originally provided the access code which was synchronized with the control station, the notification may advise the user that they will receive a message when the item is available for pickup.

If at decision block 704 it is determined that the access code has been activated, then the storage compartment is unlocked so as to allow the user to retrieve the item, as in 708. Once the user has retrieved the item, a confirmation is made that the item has been removed from the storage compartment by the user, as in 710. For example, the confirmation may include determining whether a closed-door notification has been received, as indicating that the user has closed the door of the storage compartment after retrieving the item. In addition, if an image capture device 273 within the storage compartment has been activated, video or images captured by the image capture device 273 may be reviewed or analyzed to confirm that the user has removed the item from the storage compartment. In addition or as an alternative thereto, a presence detection sensor 271 and/or motion sensor 272 within the storage compartment may be queried to confirm that the item has been removed from the storage compartment by the user.

Once a confirmation has been made that the item has been removed from the storage compartment by the user, a determination is made as to whether communication over the network is available, as in 712. If it is determined that communication over the network is available, then the control station sends a confirmation of the retrieval by the user, as in 714. The confirmation of the retrieval by the user may also include additional information such as the date and time of the retrieval. In various implementations, a message may be sent to the user confirming the retrieval by the user, as a safety measure to ensure that it was the user and not another party that retrieved the item from the storage compartment. If at decision block 712 it is determined that communication over the network is not available, then data regarding the confirmation of the retrieval by the user is stored at the pickup location for delivery to the remote computing resource when communication over the network is again available, as in 716.

Figure 8:
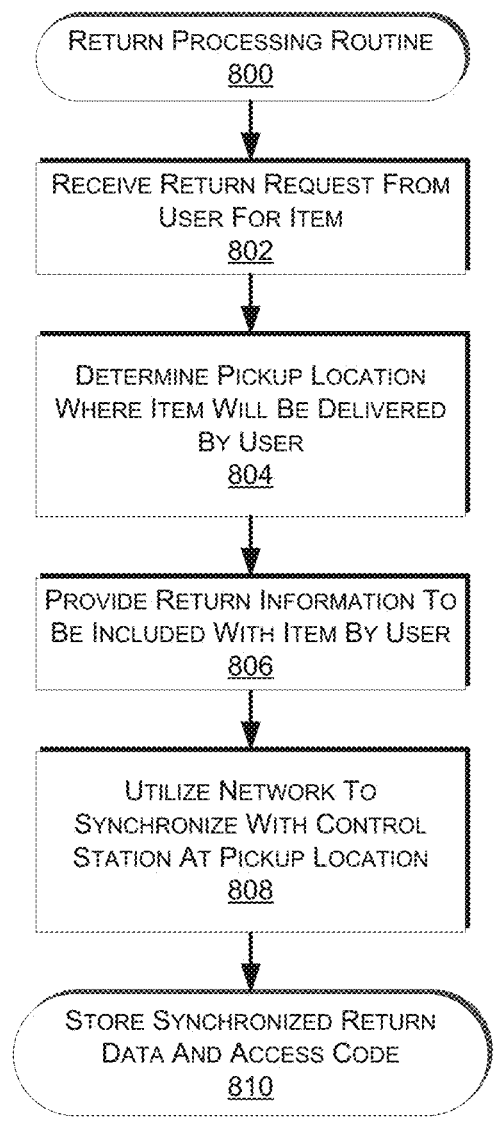
FIG. 8 is a flow diagram illustrating an example process for processing a request from a user for a return of an item.

FIG. 8 is a flow diagram illustrating an example process 800 for processing a request from a user for a return of an item. The example process 800 begins with the receipt of a return request from a user for a return of an item, as in 802. When the return request is sent, a determination is made as to what pickup location the user will deliver the item to, as in 804. In various implementations, a user may select the pickup location where the user will deliver the item based on which pickup location is most convenient for the user. In addition, one or more pickup locations may be suggested to, or selected for, a user based on factors such as proximity to a stored delivery address, past use of certain pickup locations, preferences stored by the user for certain pickup locations, current availability of certain pickup locations for receiving a delivery, etc. Once the pickup location where the item will be delivered is determined, return information is provided that will be included with the item by the user, as in 806. For example, a return slip may be generated which includes return information for the item, which the user may printout and then include in a delivery container with the item.

Once the return information that will be included with the item by the user is provided, a synchronization is performed with a control station at the pickup location, as in 808. The synchronization data may include elements such as return data and an access code that may be used by the user for placing the item in the storage compartment. In various implementations, a tracking identification for the item that may be utilized as an access code by a carrier may not be included in the return data, in that a carrier may not be contacted and the tracking identification may not be generated until the item is confirmed as having been delivered to the pickup location by the user. One reason for this is that it may be unknown exactly when or if the user will arrive with the item to place it in the storage compartment. For example, in various implementations, when a user initiates a return process, the user may be provided with a time window in which to deliver the item to the pickup location for the return, such as five days. Since it is unknown when or if during the five day period the user will deliver the item to the pickup location, it is also unknown when a carrier should be scheduled to retrieve the item.

In various implementations, the control station and remote computing resources may perform synchronization operations at regular time intervals, such as every ten minutes. Alternatively, synchronizations may be performed on demand, such as when certain new data that is to be synchronized becomes available. Once the synchronization with the control station has been performed, the synchronized return data and access code are stored, as in 810.

The access code that is included in the synchronization process may be utilized by a user for delivering the item to a storage compartment at the pickup location. In various implementations, the access code may include a unique identifier that is generated and/or provided by either the control station at the pickup location, a remote computing resource, or a user. For example, when a return for an item is requested by a user and a pickup location is selected, the control station at the pickup location may be requested to generate an access code for a storage compartment where the item will be delivered by the user. In such an implementation, the access code may be generated and sent from the control station to a remote computing resource. The sending of the access code to the remote computing resource and user ahead of time allows the user to have and utilize the access code, even if communication with the control station at the pickup location is subsequently not available. Alternatively, if the access code is generated and/or provided by either a remote computing resource or a user, during synchronization the access code may be sent to the control station at the pickup location. By storing the access code at the control station ahead of time, the access code can be used by the user to place the item in the storage compartment, without requiring communication from the remote computing resource when the user arrives.

Figure 9:
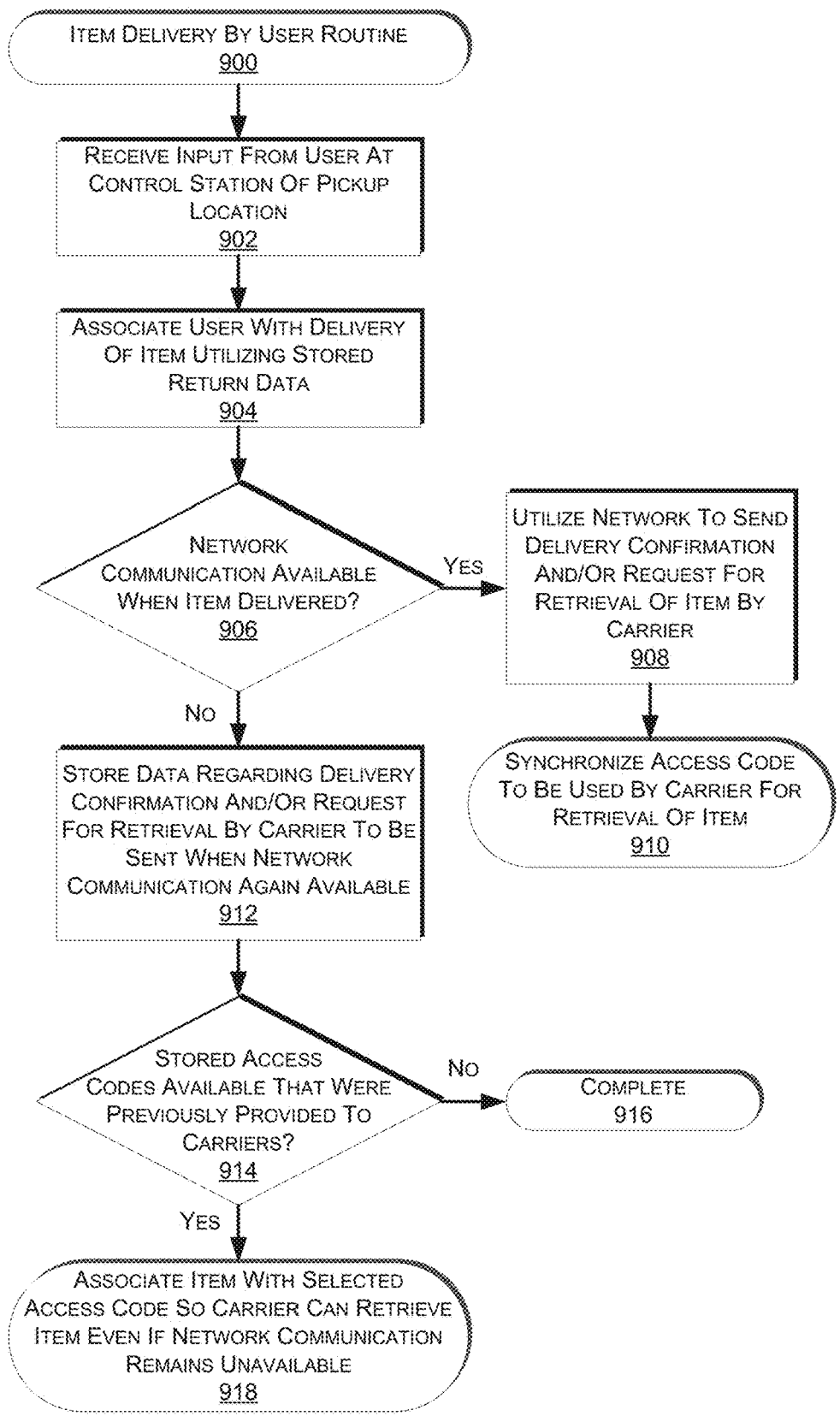
FIG. 9 is a flow diagram illustrating an example process for receiving an item delivered by a user to a pickup location as part of a return process.

FIG. 9 is a flow diagram illustrating an example process 900 for receiving an item delivered by a user to a pickup location as part of a return process. The example process begins when an input is received from the user at a control station of the pickup location, as in 902. For example, the input received from the user may include an access code that the user enters on the user interface of the control station. In various implementations, the access code may include a type of unique identifier, such as a PIN or a username and/or password. The access code may be entered by various methods, such as user typing on a keyboard or user interface of the control station, swiping a credit or other identification card through an electronic reader of the control station, etc. After the input is received from the user at the control station, the user is associated with the delivery of the item for the return utilizing stored return data, as in 904. For example, the stored return data may include the access code and an identification of a reserved storage compartment at the pickup location.

After the user has been associated with the delivery of the item, a determination is made as to whether communication over the network is available when the item is delivered, as in 906. If it is determined that communication is available when the item is delivered, then the control station sends a delivery confirmation and/or a request for a retrieval of the item by a carrier, as in 908. In various implementations, a retrieval request may be sent directly to the carrier from the control station, or may be sent in the form of a message or synchronization to a remote computing resource which indicates that the item has been delivered by the user to the pickup location and is ready for retrieval, in response to which the remote computing resource may communicate with the carrier to schedule the retrieval. Once the delivery confirmation and/or request for retrieval is sent, then an access code is synchronized to be used by a carrier for a retrieval of the item, as in 910. For example, once a carrier is contacted to schedule a retrieval of the item, an access code may be provided for the carrier, or the carrier may provide an access code such as an expected tracking identification for the retrieval of the item. By synchronizing the access code before the carrier arrives at the pickup location, the carrier can utilize the access code to retrieve the item even if network communication with the control station is not available.

If at decision block 906 it is determined that communication over the network is not available when the item is delivered by the user, then data is stored at the pickup location regarding the delivery confirmation and/or request for retrieval which will be sent to the remote computing resource and/or carrier when network communication is again available, as in 912. After the data regarding the delivery confirmation has been stored, a determination is made as to whether stored access codes are available that were previously provided to carriers, as in 914. If it is determined that no stored access codes are available, the example process completes, as in 916.

If it is determined at decision block 914 that stored access codes are available, then the item is associated with a selected stored access code so that a carrier can retrieve the item even if network communication remains unavailable, as in 918. In one implementation, a control station may have a series of repopulated access codes that are stored and provided to one or more carriers. For example, a different access code may be utilized for each day of the month. As will be described in more detail below with respect to FIG. 10, when a carrier arrives and enters an access code, such as for a daily pickup procedure, the storage compartment with the item that is being returned, as well as any other storage compartments associated with the access code, may be opened so that the carrier can retrieve the items.

Figure 10:
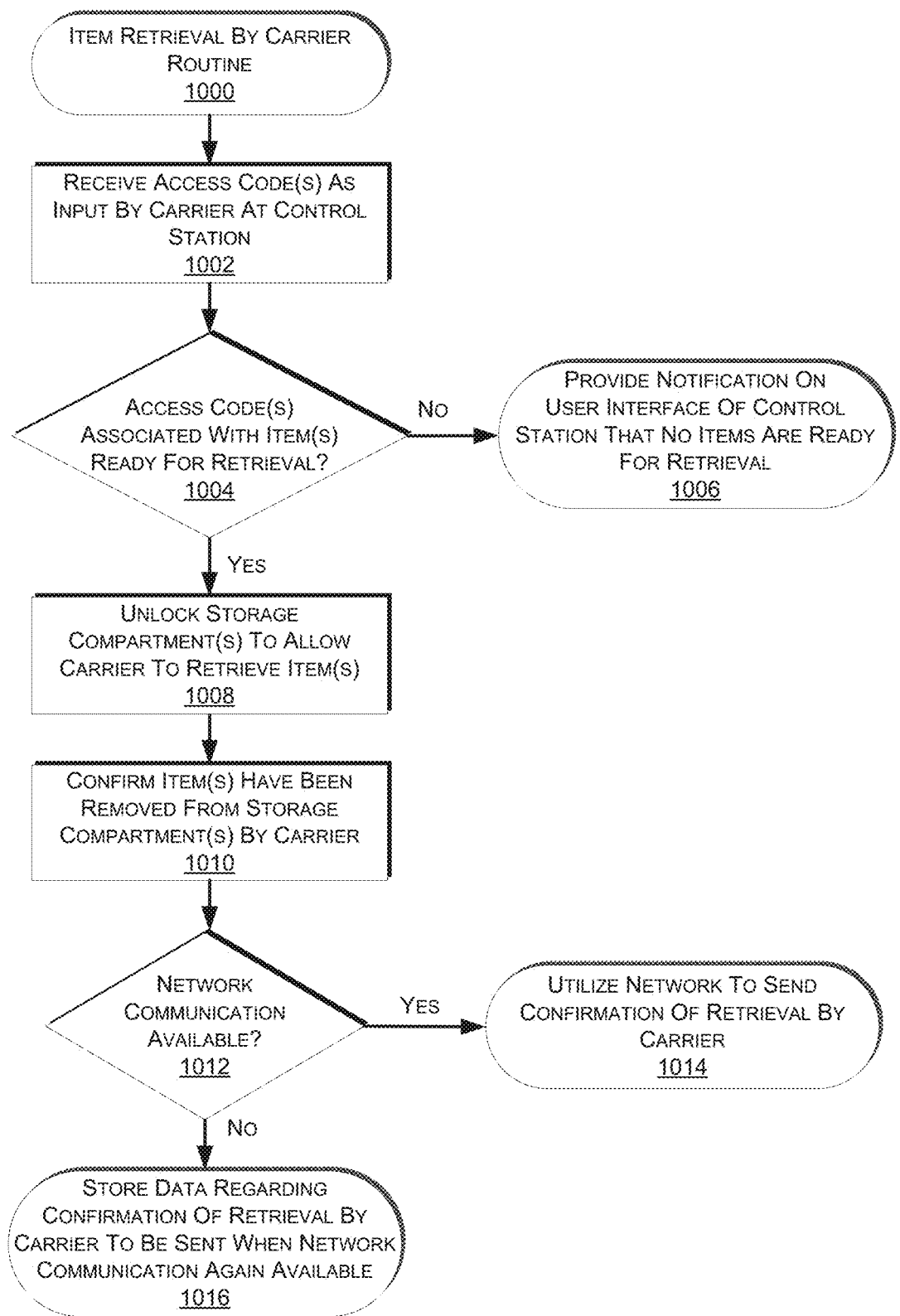
FIG. 10 is a flow diagram illustrating an example process for a carrier retrieving an item from a pickup location as part of a return process.

FIG. 10 is a flow diagram illustrating an example process 1000 for a carrier retrieving an item from a pickup location as part of a return process for the item. The example process begins with the receipt of one or more access codes as input by a carrier at a control station of the pickup location, as in 1002. One or more of the access codes may include a unique identifier, such as a PIN that may be input by the carrier on a user interface of the control station and/or scanning of a barcode, QR code, etc. In various implementations, one or more of the access codes may have been provided to or by a carrier as part of a scheduled retrieval confirmation, and may consist of an expected tracking identification for the return of the item. As described in more detail above with respect to FIG. 9, one or more access codes may have been previously provided to the carrier, such as a set of repopulated access codes, one for each day of the month.

Once the access codes as input by the carrier are received, a determination is made as to whether the access codes are associated with any items that are ready for retrieval, as in 1004. If it is determined that the access codes are not associated with any items that are ready for retrieval, then a notification is provided on the user interface at the control station that no items are ready for retrieval, as in 1006. If at decision block 1004 it is determined that the access codes are associated with one or more items that are ready for retrieval, then the storage compartments in which the one or more items are stored are unlocked so as to enable the carrier to retrieve the one or more items, as in 1008. In various implementations, an access code may be associated with one item or with multiple items. For example, a carrier may be provided with a single access code for retrieval of multiple items that are ready to be retrieved on a particular day.

Once the carrier has retrieved one or more items, a confirmation is made that all of the items that are to be retrieved have been removed from the storage compartments, as in 1010. For example, for a given storage compartment the confirmation may include determining whether a closed-door notification has been received, as indicating that the carrier has closed the door of the storage compartment after retrieving the item. In addition, if an image capture device 273 within the storage compartment has been activated, video or images captured by the image capture device 273 may be reviewed or analyzed to confirm that the carrier has removed the item from the storage compartment. In addition or as an alternative thereto, a presence detection sensor 271 and/or motion sensor 272 within the storage compartment may be queried to confirm that the item has been removed from the storage compartment by the carrier.

Once a confirmation has been made that all of the items that are to be retrieved have been removed from the storage compartments by the carrier, a determination is made as to whether communication over the network is available, as in 1012. If it is determined that communication over the network is available, then the control station sends a confirmation of the retrieval, as in 1014. The confirmation of the retrieval may also include additional information such as the date and time of the retrieval. If at decision block 1012 it is determined that communication over the network is not available, then data regarding the confirmation of the retrieval is stored at the pickup location for being sent to the remote computing resource when communication over the network is again available, as in 1016. In various implementations, the sending of the confirmation of the retrieval when communication over the network is again available may be utilized for various purposes. For example, as will be described in more detail below with respect to FIG. 11, if a confidence threshold for a carrier has not been met, the sending of the confirmation of the retrieval may allow a refund or a replacement process for the item to be initiated and/or the status of the storage compartment at the pickup location to be updated.

Figure 11:
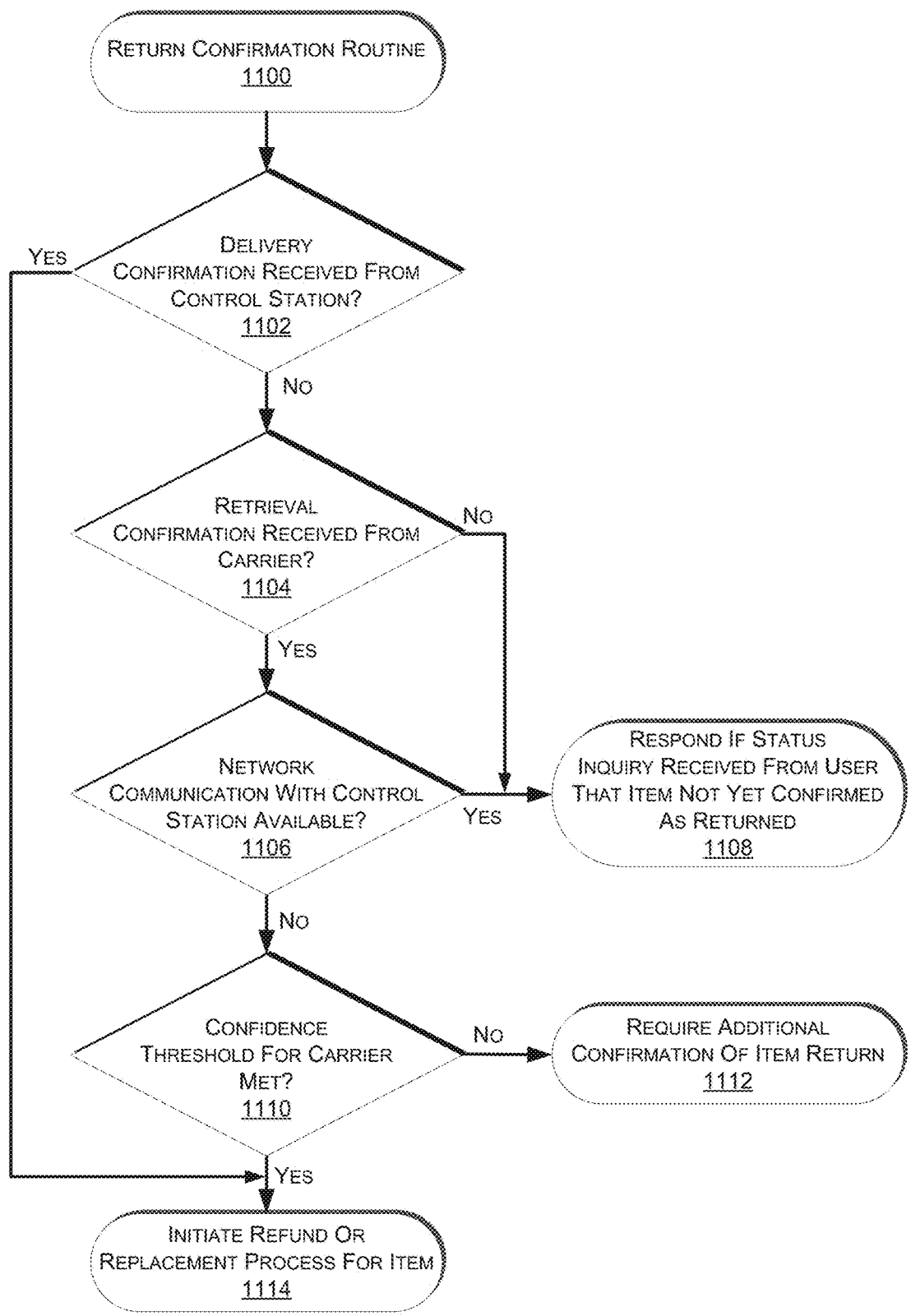
FIG. 11 is a flow diagram illustrating an example process for confirming a return of an item by a user.

FIG. 11 is a flow diagram illustrating an example process 1100 for confirming a return of an item. The example process begins with a determination of whether a delivery confirmation has been received from a control station at a pickup location, as in 1102. As described above with respect to FIG. 9, when communication is not available when an item is delivered by a user, the control station may not be able to send a delivery confirmation. If at decision block 1102 it is determined that a delivery confirmation has been received from a control station at the pickup location, then a refund or replacement process for the item may be initiated, as in 1114.

If at decision block 1102 it is determined that a delivery confirmation has not been received from the control station, then a determination is made as to whether a retrieval confirmation has been received from a carrier, as in 1104. For example, even when communication with a control station at a pickup location is not available, carriers often utilize other means for sending a retrieval confirmation, such as entry of the confirmation at a website, sending the confirmation through other electronic messaging systems, etc. If at decision block 1104 it is determined that a retrieval confirmation has been received from a carrier, then a determination is made as to whether network communication is available with the control station, as in 1106.

In various implementations, the determination as to whether network communication is available with the control station may be made in various ways, as described in more detail above with respect to FIG. 6. If at decision block 1106 it is determined that network communication is available at a time when no delivery confirmation has been received from the control station, or if at decision block 1104 it is determined that no retrieval confirmation has been received from a carrier, then if a user makes a status inquiry regarding the return of the item, the user is informed that the item has not yet been confirmed as returned, as in 1108.

If at decision block 1106 it is determined that network communication is not available with the control station at a time when a retrieval confirmation has been received from the carrier, a determination is made as to whether a confidence threshold for the carrier has been met, as in 1110. If at decision block 1110 it is determined that a confidence threshold has not been met, then additional confirmation of the return of the item is required, as in 1112. For example, an additional confirmation of the delivery of an item by a user to the pickup location may be provided from an attendant at the pickup location who communicates over a different network than the control station, or a second carrier, or the control station itself if network communication with the control station that was previously unavailable is restored. If at decision block 1110 it is determined that the confidence threshold has been met, then a refund or replacement process for the item may be initiated, as in 1114. In addition, in one implementation when the confidence threshold has been met, the status of the storage compartment which contained the item may also be updated. For example, an indication in the system of the overall available storage capacity for the pickup location may be updated to indicate that the storage compartment which had contained the item is now available to receive another item.

As described in more detail above with respect to FIG. 6, in various implementations the confidence threshold may indicate a level of confidence that is associated with a particular carrier, which may be based at least in part on past retrieval performance of the carrier. For example, over time as retrieval confirmations are received from a carrier, a record may be kept of whether corresponding retrieval confirmations are received from control stations. If there is a high level of correlation, then a high confidence level may be associated with the carrier. When a high confidence level is associated with a carrier, and when the only retrieval confirmation that is received is from the carrier, it may be determined if the confidence threshold has been met. In various implementations, the confidence threshold may be based on a specific percentage of correlation between retrieval confirmations received from control stations and retrieval confirmations received from a carrier, such as at least a 98% correlation.

In various implementations, the confidence threshold may be made to vary depending on a variety of factors. In one implementation, the confidence threshold may be made higher or lower depending on the value of the item and/or the urgency associated with the refund or replacement process for the item and/or the urgency associated with the update of the status of the storage compartment. For example, the confidence threshold may be made to be lower for a pickup location that has high volume of activity and for which the update of the status of the storage compartment may be considered more urgent.

FIG. 12 is a block diagram illustrating an example computer system 1200 configured to implement one or more of the systems or processes described herein. In various examples, the block diagram may be illustrative of one or more aspects of the control station 201 (FIG. 2) and/or the remote computing resource(s) 310 (FIG. 3) discussed above. In the illustrated implementation, the computer system 1200 includes one or more processors 1210A, 1210B through 1210N, coupled to a non-transitory computer readable storage medium 1220 via an input/output (I/O) interface 1230. The computer system 1200 further includes a network interface 1240 coupled to an I/O interface 1230, and one or more input/output devices 1250. In some implementations, it is contemplated that components of a storage compartment control system and/or a pickup location (e.g., user interface, command component, storage compartment management component, control station) may be implemented using a single instance of the computer system 1200, while in other implementations, multiple such systems or multiple nodes making up the computer system 1200 may be configured to host different portions, components or instances of a storage compartment control system and/or pickup location. For example, in one implementation, some data sources or services (e.g., capturing images or video within a storage compartment, computing available space within a storage compartment, generating an access code for a storage compartment) may be implemented via one or more nodes of the computer system 1200 that are distinct from those nodes implementing other data sources or services (e.g., providing commands to open a storage compartment, providing messaging to users or carriers, synchronizing order and return data). In some implementations, a given node may implement the functionality of more than one component of a storage compartment control system and/or a pickup location.

In various implementations, the computer system 1200 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer readable storage medium 1220 may be configured to store executable instructions and/or data accessible by the one or more processors 1210A-1210N. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1225 and data storage 1235, respectively. In other implementations, program instructions and/or data may be received, sent or stored upon different types of computer-accessible media, such as non-transitory media, or on similar media separate from the non-transitory computer readable storage medium 1220 or the computer system 1200. Generally speaking, a non-transitory, computer readable storage medium may include storage media or memory media such as magnetic or optical media, e.g., disk or CD/DVD-ROM coupled to the computer system 1200 via the I/O interface 1230. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processors 1210A-1210N, the non-transitory computer readable storage medium 1220, and any peripheral devices in the device, such as the computer systems of the storage compartment modules, the network interface 1240 or other peripheral interfaces, such as input/output devices 1250. In some implementations, the I/O interface 1230 may perform any necessary protocol, timing or other data transformations to convert data signals from one component (e.g., non-transitory computer readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer readable storage medium 1220, may be incorporated directly into the processors 1210A-1210N.

The network interface 1240 may be configured to allow data to be exchanged between the computer system 1200 and other devices attached to a network, such as other computer systems, or between nodes of the computer system 1200. For example, the network interface 1240 may utilize the wireless antennas 241, 243, 231, 245, 247 to allow interaction and interface between the storage compartment control system 326 and the command component of the control station 201 and the storage compartment management component of each connected storage compartment module 203, 205, 207, 209. In various implementations, the network interface 1240 may support communication via wired or wireless general data networks, such as any suitable type of Ethernet network. For example, the network interface 1240 may support communication via telecommunications/telephony networks such as analog voice networks or digital fiber communications networks, via storage area networks such as Fibre Channel SANs, or via any other suitable type of network and/or protocol.

Input/output devices 1250 may, in some implementations, include one or more display terminals, keyboards, keypads, touchpads, scanning devices, voice or optical recognition devices, or any other devices suitable for entering or retrieving data by one or more computer systems 1200. Multiple input/output devices 1250, such as a user interface for the storage compartment control system 326 and/or the user interface 211, may be present in the computer system 1200 or may be distributed on various nodes of the computer system 1200. In some implementations, similar input/output devices may be separate from the computer system 1200 and may interact with one or more nodes of the computer system 1200 through a wired or wireless connection, such as over the network interface 1240. For example, the computer systems of the storage compartment modules 203, 205, 207, 209 and/or the locking mechanisms of those storage compartment modules may communicate with the computer system 1200 as input/output devices 1250 over wired or wireless network interface 1240.

As shown in FIG. 12, the memory 1220 may include program instructions 1225 which may be configured to implement a storage compartment control system and/or pickup location data storage 1235, which may comprise various tables, databases and/or other data structures accessible by the program instructions 1225. In one implementation, the program instructions 1225 may include various software modules configured to implement a user interface 211, security, locking and unlocking of storage compartments, management of the pickup location, and functions of the storage compartment control system 326, such as synchronizing order and return data and access codes with the pickup location. The data storage 1235 may include various data stores for maintaining one or more storage compartment module configurations, data representing presence or absence of items contained in various storage compartments, access information for various storage compartments and/or other item parameter values. The data storage 1235 may also include one or more data stores for maintaining data representing item deliveries, retrievals, returns, hold orders, partial orders, transfer container locations, and other information utilized by the storage compartment control system and/or pickup location.

In various implementations, the parameter values and other data illustrated herein as being included in one or more data stores may be combined with other information not described or may be partitioned differently into more, fewer, or different data structures. In some implementations, data stores used in the storage compartment control system and/or in a pickup location and/or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up a pickup location system and/or any of the various components thereof described herein.

Those skilled in the art will appreciate that the computing system 1200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computing system 1200 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A pickup location apparatus, comprising:
a storage compartment with a locking mechanism; and
a control station configured to control the locking mechanism, the control station comprising:
an input device configured to receive an input of an access code; and
a computing system, comprising:
one or more processors; and
a memory coupled to the one or more processors and storing program instructions that when executed by the one or more processors cause the one or more processors to at least:
store in the memory an access code configured to be utilized by a user for retrieving an item from the storage compartment of the pickup location apparatus after a delivery of the item to the pickup location apparatus, wherein the access code is stored in the memory of the computing system prior to the delivery of the item, the access code requiring activation before it can be utilized by the user for retrieving the item from the storage compartment;
determine that an input has been received at the control station that is related to the delivery of the item to the pickup location apparatus;
activate the access code in response to the delivery of the item to the storage compartment;
determine that the input device of the control station of the pickup location apparatus has received an input of the access code from a user; and in response to the determination that the input device has received the input of the access code, control the locking mechanism to unlock the storage compartment in which the item has been stored and is configured to allow the user to retrieve the item.

2. The pickup location apparatus of claim 1, wherein the control station comprises a scanner and the input that is related to the delivery of the item comprises a carrier scanning, with the scanner, a code that is associated with the item.

3. The pickup location apparatus of claim 2, wherein the code comprises a QR code.

4. The pickup location apparatus of claim 1, wherein the access code is received from a remote computing resource while communication with the remote computing resource is available over the network.

5. The pickup location apparatus of claim 4, wherein the access code is activated while communication with the remote computing resource is not available over the network.

6. The pickup location apparatus of claim 4, wherein the locking mechanism is controlled to unlock the storage compartment while communication with the remote computing resource is not available over the network.

7. The pickup location apparatus of claim 6, wherein the program instructions when executed by the one or more processors further cause the one or more processors to store data regarding the access to the storage compartment while communication with the remote computing resource is not available over the network and to send the stored data to the remote computing resource when communication with the remote computing resource is again available over the network.

8. A computing system of a pickup location apparatus which includes a storage compartment, the computing system comprising:
   one or more processors; and
   a memory coupled to the one or more processors and storing program instructions that when executed by the one or more processors cause the one or more processors to at least:
      store an access code configured to be utilized to access the storage compartment of the pickup location apparatus, the access code requiring activation before it can be used to access the storage compartment;
      determine that an input has been received that is related to a delivery of an item to the pickup location apparatus;
      after the delivery of the item to the storage compartment, activate the access code;
      receive the access code as input by a user at the pickup location apparatus; and
      in response to the receipt of the access code, control a locking mechanism to unlock a storage compartment containing the item to allow the user to access the storage compartment to retrieve the item.

9. The computing system of claim 8, wherein the input that is related to the delivery of the item comprises a scanning of a code that is associated with the item.

10. The computing system of claim 9, wherein the scanned code that is associated with the item comprises a QR code.

11. The computing system of claim 9, wherein the program instructions when executed by the one or more processors further cause the one or more processors to utilize stored order data to associate the scanned code with an order for the item.

12. The computing system of claim 8, wherein the program instructions when executed by the one or more processors further cause the one or more processors to utilize a sensor of the pickup location apparatus to confirm that the item is in the storage compartment before the access code is activated.

13. The computing system of claim 8, wherein the program instructions when executed by the one or more processors further cause the one or more processors to receive the access code from a remote computing resource prior to the delivery of the item to the pickup location apparatus.

14. The computing system of claim 8, wherein the program instructions when executed by the one or more processors further cause the one or more processors to at least:
   generate the access code prior to the delivery of the item to the pickup location apparatus; and
   send the access code to a remote computing resource to be stored in a memory of the remote computing resource prior to the delivery of the item to the pickup location apparatus.

15. A computer implemented method, comprising:
   under control of one or more computing devices of a pickup location apparatus that are configured with executable instructions,
      storing an access code configured to be utilized to access a storage compartment of the pickup location apparatus, the access code requiring activation before it can be utilized to access the storage compartment, wherein the pickup location apparatus comprises the storage compartment and a control station with an input device, the storage compartment comprising a locking mechanism that the control station is configured to control;
      determining that an input has been received that is related to a delivery of an item to the pickup location apparatus;
      after the delivery of the item to the storage compartment, activating the access code;
      receiving the access code as input at the pickup location apparatus; and
      in response to the receiving of the access code, controlling the locking mechanism to unlock the storage compartment containing the item to allow a user to access the storage compartment to retrieve the item.

16. The computer implemented method of claim 15, wherein the control station comprises a scanner and the input that is related to the delivery of the item comprises a code that is scanned by the scanner.

17. The computer implemented method of claim 15, wherein the code that is scanned by the scanner comprises a QR code.

18. The computer implemented method of claim 15, further comprising utilizing a sensor of the pickup location apparatus to confirm that the item is in the storage compartment before the access code is activated.

19. The computer implemented method of claim 15, further comprising receiving the access code before storing the access code, wherein the access code is received from a remote computing resource while communication with the remote computing resource is available over a network.

20. The computer implemented method of claim 15, further comprising:
  generating the access code before storing the access code; and
  sending the access code to a remote computing resource while communication with the remote computing resource is available over a network, wherein the access code is sent to the remote computing resource before the item is delivered to the pickup location apparatus.

* * * * *